US007087915B2

(12) United States Patent
Takahashi et al.

(10) Patent No.: US 7,087,915 B2
(45) Date of Patent: Aug. 8, 2006

(54) RADIATION IMAGE REPRODUCING DEVICE AND METHOD FOR REPRODUCING RADIATION IMAGE

(75) Inventors: Kenji Takahashi, Kanagawa (JP); Tomotake Ikada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/368,361

(22) Filed: Feb. 20, 2003

(65) Prior Publication Data

US 2003/0173532 A1 Sep. 18, 2003

(30) Foreign Application Priority Data

Feb. 20, 2002 (JP) ............................ 2002-043680

(51) Int. Cl.
*G03B 42/00* (2006.01)

(52) U.S. Cl. ...................... 250/584; 250/585; 250/586; 250/361 R; 250/484.2

(58) Field of Classification Search ................ 250/584, 250/585, 586, 361 R, 484.2
See application file for complete search history.

(56) References Cited

U.S. PATENT DOCUMENTS 4,818,877 A * 4/1989 Ayrai et al. .............. 250/484.2
5,444,234 A * 8/1995 Hennerici et al. ....... 250/206.2
6,268,614 B1 7/2001 Imai

FOREIGN PATENT DOCUMENTS

GB 1185832 A * 3/1970

OTHER PUBLICATIONS

European Search Report dated Feb. 17, 2004.

* cited by examiner

*Primary Examiner*—David Porta
*Assistant Examiner*—Shun Lee
(74) *Attorney, Agent, or Firm*—Sughrue Mion, PLLC

(57) ABSTRACT

A device for reproducing a radiation image is composed of a radiation-absorbing phosphor layer containing a phosphor which absorbs a radiation and then emits a light, a stimulable phosphor layer containing a stimulable phosphor which absorbs the light and stores energy of the light which is releasable in the form of light emission by stimulation with electric field, an electrode layer placed on each surface of the stimulable phosphor layer in which at least one electrode layer is a light-transmitting electrode, and a light-detecting layer which is arranged on the light-transmitting electrode.

17 Claims, 13 Drawing Sheets

RADIATION IMAGE REPRODUCING DEVICE AND METHOD FOR REPRODUCING RADIATION IMAGE

FIELD OF THE INVENTION

The present invention relates to a radiation image reproducing device and a method for reproducing a radiation image.

BACKGROUND OF THE INVENTION

As a method replacing a conventional radiography, a radiation image storing and reproducing method utilizing a stimulable phosphor was proposed, and is practically employed. The radiation image storing and reproducing method employs a radiation image storage panel (i.e., stimulable phosphor sheet) comprising a stimulable phosphor, and comprises the steps of causing the stimulable phosphor of the storage panel to absorb radiation energy having passed through a subject or having radiated from a subject so as to excite the stimulable phosphor; sequentially re-exciting the stimulable phosphor with an electromagnetic wave such as visible light or infrared rays (i.e., stimulating light) to release the radiation energy stored in the phosphor as light emission (i.e., stimulated emission); photoelectrically detecting the emitted light to obtain a series of electric signals; and reproducing the radiation image of the object as a visible image from the series of electric signals. The storage panel thus treated is subjected to a step for erasing a radiation energy remaining therein, and then stored for the next image storing and reproducing procedure. Thus, the radiation image storage panel can be repeatedly employed.

The radiation image storage panel employed in the above-mentioned procedure has a basic structure comprising a support and a stimulable phosphor layer provided thereon. If the phosphor layer is self-supporting, the support may be omitted. On the free surface (surface not facing the support) of the phosphor layer, a transparent protective film is generally placed to keep the phosphor layer from chemical deterioration or physical damage.

The phosphor layer generally comprises a binder and stimalable phosphor particles dispersed therein. However, it may consist of agglomerated phosphor with no binder. The phosphor layer containing no binder can be produced by deposition process or firing process. Further, the phosphor layer comprising agglomerated phosphor soaked with a polymer is also known. In any types of phosphor layers, the stimulable phosphor releases a stimulated emission when re-excited with a stimulating light after having been exposed to a radiation such as X-rays. Accordingly, the radiation in the form of an image having passed through a subject or radiated from a subject is absorbed by the phosphor layer of the storage panel in proportion to the applied radiation dose, and a radiation image of the object is produced in the storage panel in the form of a latent radiation energy-stored image. The latent radiation energy-stored image can be released as stimulated emission by sequentially irradiating the panel with stimulating light. The stimulated emission is then photoelectrically detected to give electric signals, so as to reproduce a visible image from the electric signals.

Even in the radiation image storing and reproducing method described above, it is naturally desired that a radiation image is reproduced with a high sensitivity and with good image quality (such as a high sharpness and a good graininess). Further, it is desired to make the apparatus for the radiation image storing and reproducing method as compact as possible with a lower cost. It is also desired that the radiation image is reproduced as quick as possible.

EP 1 113 292 A2 discloses a new radiation image reproducing system employing a combination of a radiation image storage panel containing a stimulable phosphor (i.e., energy-storing phosphor) and a fluorescent sheet which absorbs a radiation and subsequently emits a light of a ultraviolet to visible region (i.e., radiation-absorbing phosphor). Thus, in the above-mentioned new system, the function of absorbing a radiation and the function of storing the absorbed radiation are separated from each other, and each function is allotted to a separate element. In this system, the radiation having passed through a subject or other image-wise radiation is first converted in the element containing the radiation-absorbing phosphor to give a light emission of a ultraviolet to visible region (i.e., first stimulation); the light is then absorbed and stored in the energy-storing phosphor in the form of a latent energy; the stored energy is then released as a light emission by re-exciting the phosphor with a stimulating light (i.e., second stimulation); and the last light emission is photoelectrically read to obtain a series of electric signals for reproducing the radiation image.

It is known that certain stimulable phosphors such as ZnS:Cu can be excited by application of a light of a ultra-violet light to visible region to store the energy and then stimulated by electric field to give a light emission. This phenomenon is called "Gudden-Pohl" effect.

Japanese Patent Provisional Publication No. 62-69182 describes a two-dimensional radiation detecting device utilizing the Gudden-Pohl effect. The disclosed detecting device comprises a stimulable phosphor layer, an electrode layer or a group of electrode layer which stimulates the stimulable phosphor with electric field, and a two-dimensional detecting layer. These layers are combined adjacently with each other to form a multi-layered composite structure. On the composite structure, a radiation is impinged to form in the stimulable phosphore layer a latent image of the radiation. Thereafter, the stimulable phosphor layer is stimulated by electric field to give a light emission which is instantly detected in the two-dimensional detecting layer as a photoelectric current.

U.S. Pat. No. 4,818,877 describes a memory display system which includes a recording support medium having a layer of a luminescent material capable of storing energy coming from a light beam such as an X-ray beam, electrodes enclosing the luminescent material and applying thereto an electric field for releasing the previously stored energy in the form of a beam; an optical transmission device placed in the path of said beam; a sensor receiving this beam and converting the intensity of the light beam into an electric signal; and a processing circuit receiving said electric signal, processing it and controlling display thereof on a display device.

In each radiation image-reproducing system, the radiation energy is absorbed and stored only in the phosphor layer to be stimulated with the electric field. Therefore, it is difficult to realize both of a high radiation-absorbing efficiency and use it with a high electric field in each phosphor layer.

SUMMARY OF THE INVENTION

The present invention has an object to provide a new radiation image reproducing method that gives a high detection quantum efficiency and reproduces a radiation image with a high quality.

The invention further has an object to provide a new radiation image-reproducing method in which the image reading procedure can be performed quickly.

The invention furthermore has an object to provide a radiation image reproducing device that is favorably employed in the radiation image-reproducing method.

As a result of a series of studies on improvement of detection quantum efficiency (DQE) in the radiation image reproducing method, the inventor has reached an idea to employ two or more kinds of phosphors, one of which efficiently absorbs a radiation such as X-rays applied to the phosphor and releases a spontaneous light emission, and other of which efficiently absorbs the light emission and stores the energy which can be released in the form of light emission when it is stimulated with electric field. The stimulation with electric field employed for the second stimulation makes it possible to excite the energy stored in the stimulable phosphor layer to produce a light emission rapidly utilizing a simple and compact reading means.

Further, if the application of electric field for the second stimulation is performed by point-scanning or line-scanning, the efficiency of collecting the produced light emission highly increases because it is not required to separate the light emission from the stimulating light in the image reading procedure.

Furthermore, since the above-mentioned system does not require a source of stimulating light and a storage panel-transferring system, particularly utilizing a photoelectric conversion means (e.g., photoconductive layer) or a fluorescence light-collecting layer, the radiation image reproducing procedure can be performed in a compact and low cost apparatus.

The present invention resides in a device (Device I) for reproducing a radiation image comprising at least one radiation-absorbing phosphor layer containing a phosphor which absorbs a radiation and subsequently emits a light (preferably, a light of a ultraviolet and visible regions) a stimulable phosphor layer containing a stimulable phosphor which absorbs the light and stores energy of the light therein which is releasable in the form of light emission by stimulation with electric field, an electrode layer placed on each of upper surface and lower surface of the stimulable phosphor layer in which each electrode layer is a light-transmitting electrode layer, and a light-detecting layer which is arranged on the light-transmitting electrode layer of the stimulable phosphor layer.

In the specification, the term of "light-transmitting electrode" is used to mean mainly a known transparent electrode, but to include a partly light-transmitting metallic electrode in the form of mesh or fine strips as well as a combination of the transparent electrode and the partly light-transmitting metallic electrode. The partly light-transmitting metallic electrode in the form of mesh or fine strips shows a high UV light transmittance, and therefore is particularly favorably employable as the electrode to be placed between the stimulable phosphor layer and the radiation energy-absorbing phosphor layer.

The light-detecting layer preferably is a two dimensional light-detecting layer and preferably is a combination of a photoelectric conversion layer and a pair of electrode layers each of which is placed on each surface of the photoelectric conversion layer under the condition that at least the electrode layer to be placed on the side facing the stimulable phosphor layer is a light-transmitting layer. Also preferably employed is a structure comprising a fluorescence light-collecting optical waveguide layer.

The above-mentioned Device I is favorably employed in a method for reproducing a radiation image which comprises the steps of:

applying onto Device I an image of radiation having passed through a subject, an image of radiation having been emitted by a subject, or an image of radiation having been scattered or diffracted by a subject, so as to excite the stimulable phosphor and store energy of the applied radiation in the stimulable phosphor layer in the form of a two-dimensional latent energy image directly and after conversion in the radiation-absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission in the light-detecting layer;

converting the collected light emission into a series of electric signals; and producing an image corresponding to the latent image by processing the electric signals.

The present invention further resides in a device (Device II) for reproducing a radiation image comprising at least one radiation-absorbing phosphor layer containing a phosphor which absorbs a radiation and subsequently emits a light, a stimulable phosphor layer containing a stimulable phosphor which absorbs the light and stores energy of the light therein which is releasable in the form of light emission by stimulation with electric field, and a light-transmitting electrode layer placed on each of upper surface and lower surface of the stimulable phosphor layer.

The above-mentioned Device II is favorably employed in a method for reproducing a radiation image which comprises the steps of:

applying onto Device II an image of radiation having passed through a subject, an image of radiation having been emitted by a subject, or an image of radiation having been scattered or diffracted by a subject, so as to excite the stimulable phosphor and store energy of the applied radiation in the stimulable phosphor layer in the form of a two-dimensional latent energy image directly and after conversion in the radiation-absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission through the light-transmitting electrode layer on the side having no radiation-absorbing phosphor layer;

converting the collected light emission into a series of electric signals; and producing an image corresponding to the latent image by processing the electric signals.

The invention furthermore resides in a set for reproducing a radiation image which is composed of a fluorescent-light collector containing a phosphor which absorbs a radiation and subsequently emits a light and a radiation image storage panel comprising a stimulable phosphor layer containing a stimulable phosphor which absorbs the light and stores energy of the light therein which is releasable in the form of light emission by stimulation with electric field, and a light-transmitting electrode layer placed on each of upper surface and lower surface of the stimulable phosphor layer.

The above-mentioned set for reproducing a radiation image is favorably employed in a method for reproducing a radiation image which comprises the steps of;

combining the fluorescent-light collector and the radiation image storage panel of the set in such manner that the fluorescent-light collector is arranged on the stimulable phosphor layer via the light-transmitting electrode layer;

applying onto the fluorescent sheet or the radiation image storage panel a radiation having passed through a subject, a radiation having been emitted by a subject, or a radiation having been scattered or diffracted by a subject, so as to excite the stimulable phosphor and store energy of the applied radiation in the stimulable phosphor layer in the form of a two-dimensional latent energy image directly and after conversion in the radiation-absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission by the fluorescent light collector through the light-transmitting electrode layer on the side having no radiation-absorbing phosphor layer;

converting the fluorescent light into a series of electric signals; and producing an image corresponding to the latent image by processing the electric signals.

In the invention, the radiation employable for the radiation image reproduction means X-rays, α-rays, β-rays, γ-rays, ultraviolet rays, neutron-rays, or their analogous rays. The ultraviolet to visible wavelength region means a wavelength range of 200 nm to 600 nm, while the visible to infrared wavelength region means a wavelength range of 400 nm to 1,600 nm.

BRIEF DESCRIPTION OF DRAWINGS

Each of FIG. 5

Each of FIG. 16 to FIG. 19 illustrates a further example of the reading device which is employable in the radiation image-reproducing method according to the invention.

Each of FIG. 20 through FIG. 23 illustrates a still further example of the radiation image-reproducing device of according to the invention.

DETAILED DESCRIPTION OF THE INVENTION

[Structure of Radiation Image-reproducing Device]

The radiation image-reproducing device of the invention (i.e., Device I and Device II) has at least one radiation-absorbing phosphor layer, a stimulable phosphor layer, and a pair of electrode layers. (each of which is arranged on each surface of the stimulable phosphor layer and both of the electrodes are light-transmitting). The radiation-absorbing phosphor layer contains a phosphor which emits a light (preferably, in the ultraviolet to visible region) upon absorbing a radiation. The stimulable phosphor layer contains a stimulable phosphor that absorbs the light emitted by the radiation-absorbing phosphor and stores energy of the absorbed light therein. Upon stimulation with electric field, the stimulable phosphor releases the stored energy in the form of a light emission. The stimulable phosphor layer per se also absorbs the applied radiation directly. Accordingly, the light emitted by the radiation-absorbing phosphor layer and the applied radiation in combination form the latent radiation image.

The concept of the invention can be put in practice further by a set of a radiation image storage panel comprising a stimulable phosphor layer and a pair of light-transmitting electrode layers and a fluorescent sheet comprising a radiation-absorbing phosphor layer (i.e., radiation image-reproducing set).

The radiation image-reproducing device preferably has a two-dimensional light-detecting layer (e.g., a structure comprising a photoelectric conversion layer or a fluorescent light-collecting optical waveguide layer, which can detect a two-dimensionally distributed light that is released by the stimulation of the stimulable phosphor layer) on the light-transmitting electrode layer arranged on the surface of the stimulable phosphor layer. In the specification, this device is named Device I.

The radiation image-reproducing device of the invention is described with reference to the attached drawings.

Figure 1:
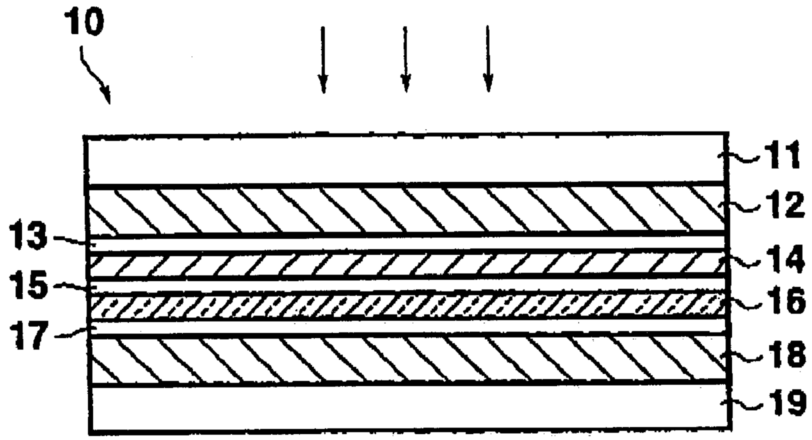
FIG. 1 illustrates one representative example of the radiation image-reproducing device according to the invention.

FIG. 1 is a schematic view showing a representative example of Device I according to the invention. A group of arrows indicate the direction of the applied radiation.

In FIG. 1, Device I (i.e., one representative radiation image-reproducing device of the invention) comprises a support sheet (or a protective layer) 11, a radiation-absorbing phosphor layer 12, a light-transmitting electrode layer 13, a stimulable phosphor layer 14, a light-transmitting electrode layer 15, a photoelectric conversion layer 16, a light-transmitting electrode layer 17, a radiation-absorbing phosphor layer 18, and a support sheet (or a protective layer) 19, in order.

The support sheet has a thickness generally of 50 to 1,000 μm, preferably of 120 to 350 μm. The support sheet can be placed on a substrate such as a carbon fiber sheet or an aluminum sheet.

The protective layer has a thickness generally of approx. 1 μm to 20 μm, preferably of 3 to 15 μm.

The radiation-absorbing phosphor layer 12 on the side facing the radiation source (called "front side") has a thickness, generally, of 50 to 200 μm, preferably of 100 to 150 μm. The radiation-absorbing phosphor layer 18 on the back side has a thickness equal to or larger than the thickness of the front side radiation-absorbing phosphor layer 12, and has a thickness, generally of 50 to 300 μm, preferably of 100 to 250 μm. If any of the radiation-absorbing phosphor layer has a divided area to show anisotropy, its thickness can be up to about 800 μm (preferably less than 600 μm).

The stimulable phosphor layer 14 can store the radiation energy directly and further by absorbing a light of ultraviolet to visible region emitted by the radiation-absorbing phosphor layers 12, 18. Therefore, the stimulable phosphor layer can be made thin to reach generally the range of 1 to 50 μm, preferably 5 to 20 μm. It is preferred that the thickness of stimulable phosphor layer 14 is smaller than the total thickness of the two radiation-absorbing phosphor layers 12, 18. Preferably, the stimulable phosphor layer 14 has a thickness of larger than 0.1% and smaller than 50%, specifically larger than 0.2% and smaller than 20%, based on the total thickness of the two radiation-absorbing phosphor layers 12, 18. Such thin thickness of the stimulable phosphor layer 14 makes it possible to apply a strong electric field to the phosphor layer 14 by a combination of the light-transmitting electrode layers 13, 15 which is arranged on both sides of the phosphor layer 14.

The photoelectric conversion layer 16 generally has a thickness of 0.1 to 50 μm. If the photoelectric conversion layer is made of an inorganic material such as a-Si, its thickness preferably is in the range of 0.1 to 5 μm. If the photoelectric conversion layer is made of an organic material, its thickness preferably is in the range of 5 to 20 μm.

Each of the light-transmitting electrode layers 13, 15, 17 can be a transparent electrode such as ITO or a light-transmitting metallic electrode made of aluminum or the like in the form of mesh or strips. The metallic electrode in the form of mesh shows a high transmittance of a ultraviolet light, and hence is favorably employed as the electrode layers 13,15,17 placed between the radiation-absorbing phosphor layers 12,18.

The inside of the radiation image-reproducing device 10 is preferably shielded from ambient light, because the device contains a photoelectric conversion layer in its inside. Therefore, the support sheet is preferably made of light-shielding material or provided with a light-shielding layer. Further, the radiation image-reproducing device is preferably shielded at its peripheral edge with light-shielding material. However, if the device is used in a cassette or other light-shielding case, there is no need of providing the light-shielding structure to the device per se.

In the radiation image-reproducing device 10, each of two radiation-absorbing phosphor layers 12, 18 is arranged on each surface side of the stimulable phosphor layer 14. The radiation applied onto the device as well as the light emission (fluorescence) produced in the radiation-absorbing phosphor layers upon receiving the radiation enter the stimulable phosphor layer to form in conjunction a latent radiation image therein.

The latent radiation image formed in the stimulable phosphor layer 14 is released in the form of light emission when the stimulable phosphor layer 14 is stimulated with application of electric field. The application of electric field is brought by the two light-transmitting electrode layers 13, 15. Details are described hereinafter.

Figure 2:
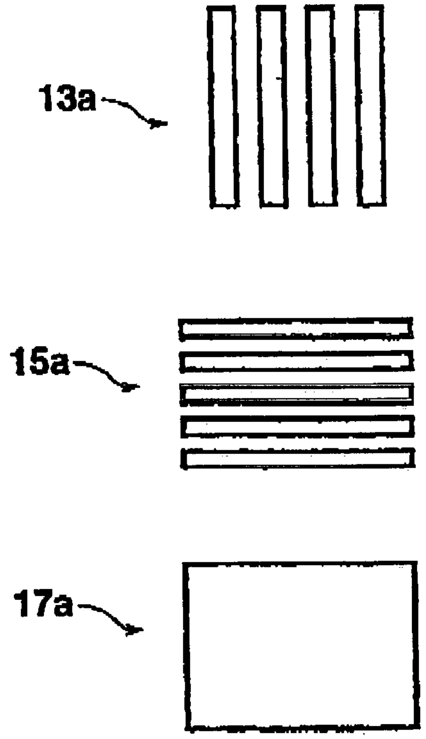
FIG. 2 shows patterns of the light-transmitting electrode layers.

If the stimulation with electric field is to be performed by point-scanning, the two light-transmitting electrode layers 13, 15 are formulated in the forms of fine strip pattern 13*a*, 15*a* of FIG. 2. The electrode layer 17 for the photoelectric conversion layer 16 is formulated in the form of plane layer 17*a* of FIG. 2. The spaces between the adjoining strips preferably are small, so long as both electrode strips are electrically separated from each other.

As is illustrated in FIG. 1, the electrode layer 15 serves for supplying electric field to the stimulable phosphor layer 14 and also for supplying electric field to the photoelectric conversion layer 16. Alternatively, an electrode layer for the phosphor layer and an electrode layer for the photoelectric conversion layer is independently provided to each layer under the condition that each layer is electrically separated from each other by an insulating layer.

As described above, the strip pattern 13*a* is for the electrode layer 13 on the front side, the strip pattern 15*a* is for the electrode layer 15 on the back side. The strips 13*a* are arranged to cross the strips 15*a*. The plane layer 17*a* is for the electrode layer 17 of the photoelectric conversion layer 16. The patterns of the electrode arrangements 15*a*, 17*a* can be exchanged with each other.

It is preferred that all strip electrodes have the same size and the same shape. The width of each strip preferably is in the range of 5 to 500 μm, and the space between the adjoining strips preferably is in the range of 0.1 to 50 μm.

As described above, the electrode layer 17 for the photoelectric conversion layer 16 can be a plane electrode layer 17*a*. The electrode layer 17 can be divided into several portions, which may correspond to the pattern 15*a*, so as to improve response for reproducing the radiation image.

Figure 3:
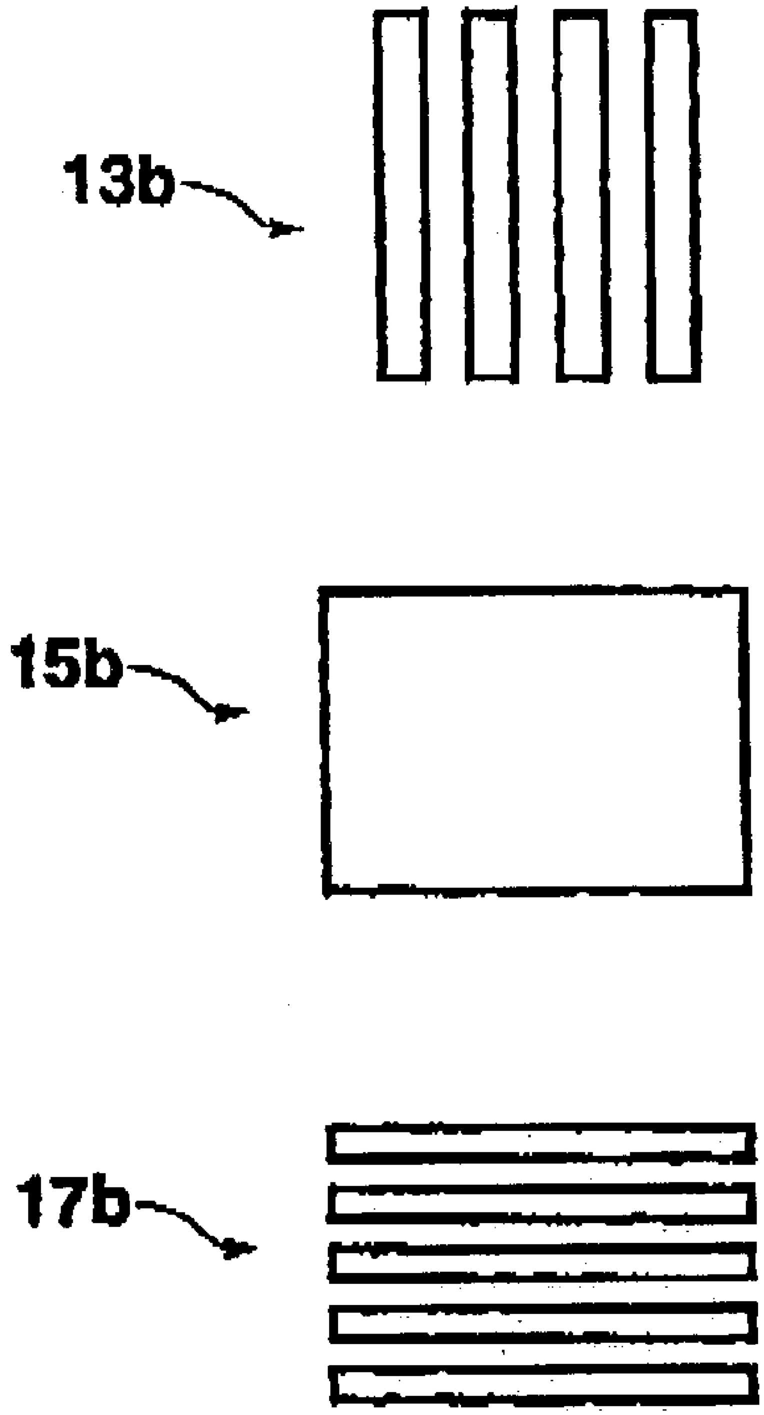
FIG. 3 shows other patterns of the light-transmitting electrode layers.

If the stimulation with electric field is to be performed by line-scanning, the front side light-transmitting electrode layer 13 is formulated in the form of fine strip pattern 13*b* of FIG. 3, while the back side light-transmitting electrode layer 15 is formulated in the form of a plane layer 15*b* of FIG. 3. The electrode layer 17 for the photoelectric conversion layer 16 is formulated in the form of a strip pattern 17*b* of FIG. 3. The strips 17*b* cross the strips 13*b*.

The electric current generated in the photoelectric conversion layer 16 is taken out from each electrode strip 17*b*.

Alternatively, the electrode layer 15 can be made of two independent electrode layers which are separated from each other with an insulating layer.

Figure 20:
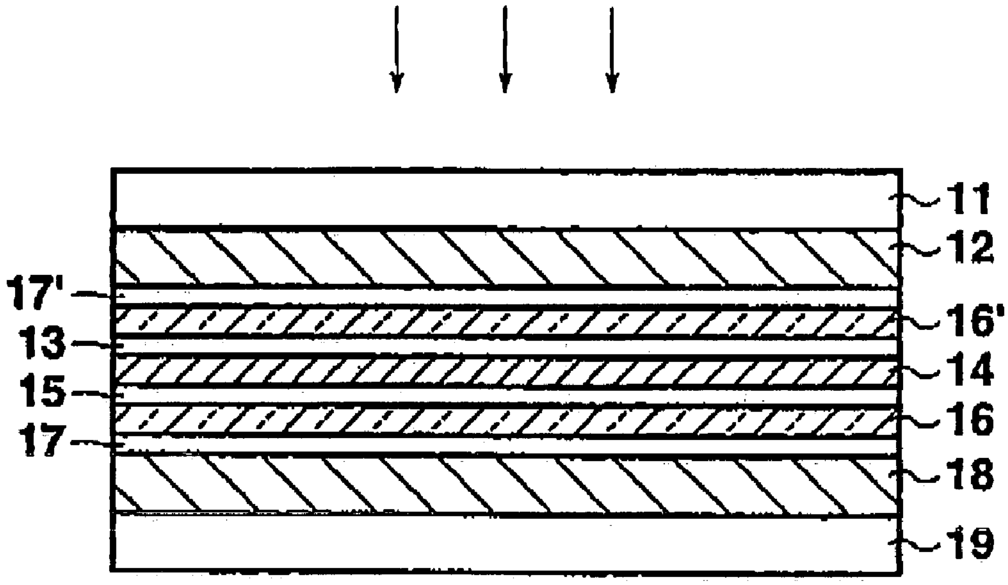

The radiation image-reproducing device can have two photoelectric conversion layers, as illustrated in FIG. 20. FIG. 20 shows Device I having such constitution. In more detail, Device I of FIG. 20 comprises a support sheet 11, a radiation-absorbing phosphor layer 12, a light-transmitting electrode layer 17', a photoelectric conversion layer 16', a light-transmitting electrode layer 13, a stimulable phosphor layer 14, a light-transmitting electrode layer 15, a photoelectric conversion layer 16, a light-transmitting electrode layer 17, a radiation-absorbing phosphor layer 18, and a support sheet 19. The electrode layer 17' has the same electrode pattern as that of the electrode layer 17.

The latent radiation image stored in the stimulable phosphor layer can be released in the form of a light emission by excitation with application of electric field supplied by the electrode layer 13, 15; the light emission is absorbed and converted into electric current in the photoelectric conversion layers 16, 16'; and finally the electric current is detected by the combination of the electrode layers 17, 17'. This means that the reproduction of radiation image can be accomplished with increased detection quantum efficiency (DQE).

Figure 4:
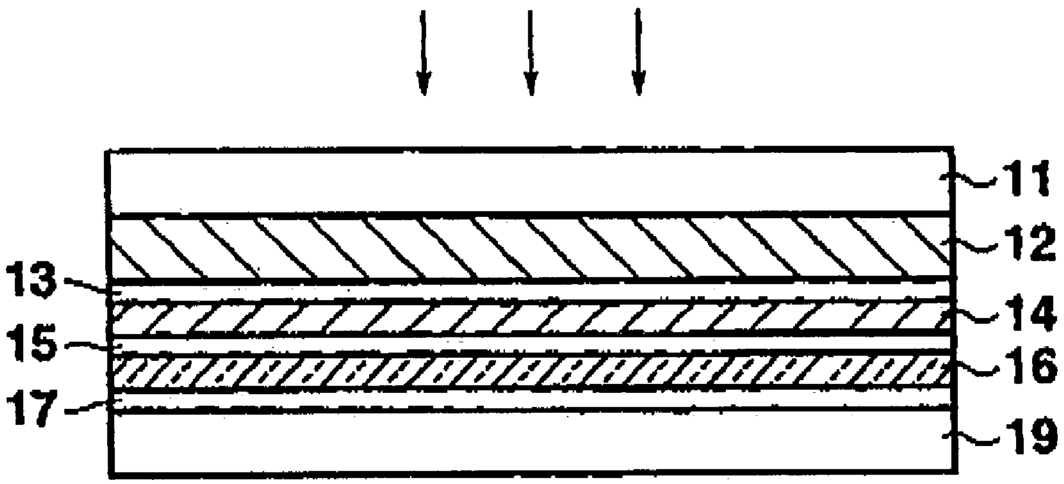
FIG. 4 illustrates another example of the radiation image-reproducing device-according to the invention.

One radiation-absorbing phosphor layer, for instance, the phosphor layer on the back side, can be omitted from the radiation image-reproducing device. In FIG. 4, Device I is composed of a support sheet 11, a radiation-absorbing phosphor layer 12, a light-transmitting electrode layer 13, a stimulable phosphor layer 14, a light-transmitting electrode layer 15, a photoelectric conversion layer 16, a light-transmitting electrode layer 17, and a support sheet 19. This constitution is favorably employed in the case that the radiation-absorbing phosphor layer has a large capacity to absorb the radiation.

Figure 5:
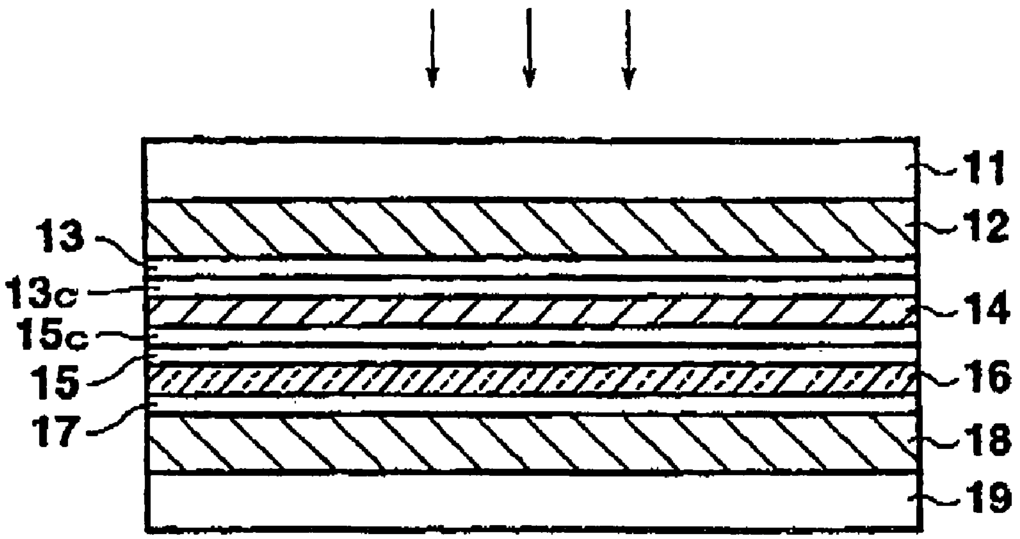

An insulating layer can be placed between the stimulable phosphor layer and each of the electrode layers. Device I illustrated in FIG. 5 contains each of insulating layers 13*c*, 15*c* between the stimulable phosphor layer 14 and the light-transmitting electrode layer 13, and the stimulable phosphor layer 14 and the light-transmitting electrode layer 15, respectively. It ought to be noted, however, that the surface of the phosphor layer or phosphor particle is so adjusted as not to cause electroluminescence (EL) in the stimulable phosphor layer when the phosphor layer is stimulated with electric field without having received a radiation. The insulating layer can be arranged only on one side.

Figure 21:
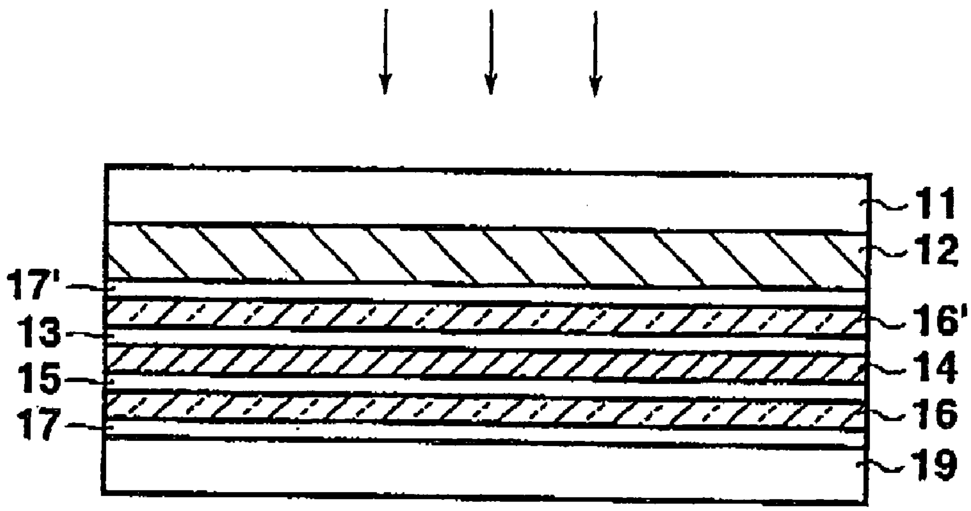
Figure 22:
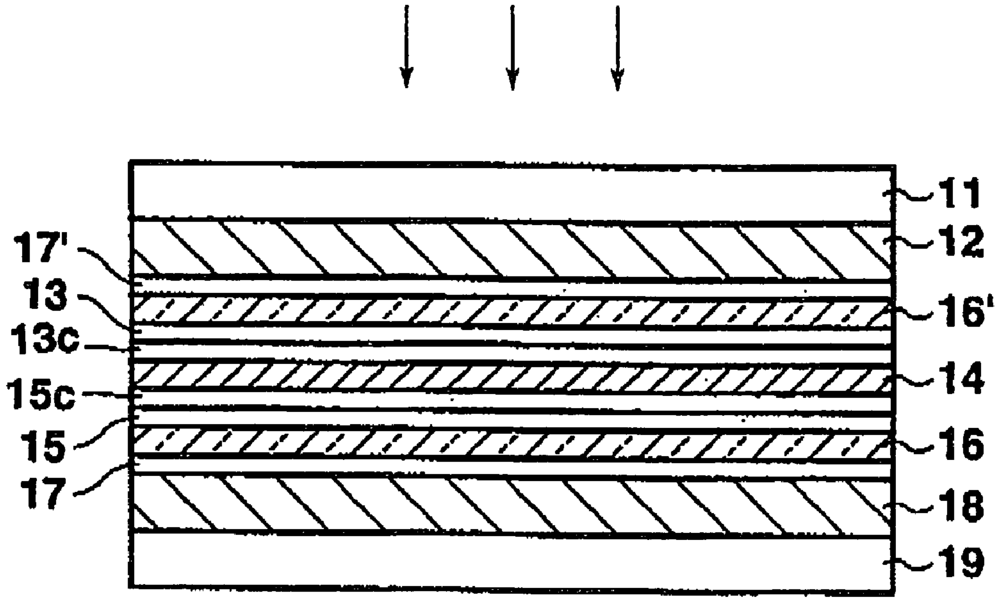

In FIGS. 21 and 22, Device I has a different constitution. Device I of FIG. 21 is composed of a support sheet 11, a radiation-absorbing phosphor layer 12, a light-transmitting electrode layer 17', a photoelectric conversion layer 16', a light-transmitting electrode layer 13, a stimulable phosphor layer 14, a light-transmitting electrode layer 15, a photoelectric conversion layer 16, a light-transmitting electrode layer 17, and a support sheet 19. Device I of FIG. 22 is composed of a support sheet 11, a radiation-absorbing phosphor layer 12, a light-transmitting electrode layer 17', a photo-electric conversion layer 16', a light-transmitting electrode layer 13, an insulating layer 13*c*, a stimulable phosphor layer 14, an insulating layer 15*c*, a light-transmitting electrode layer 15, a photoelectric conversion layer 16, a light-transmitting electrode layer 17, a radiation-absorbing phosphor layer, and a support sheet 19.

Figure 6:
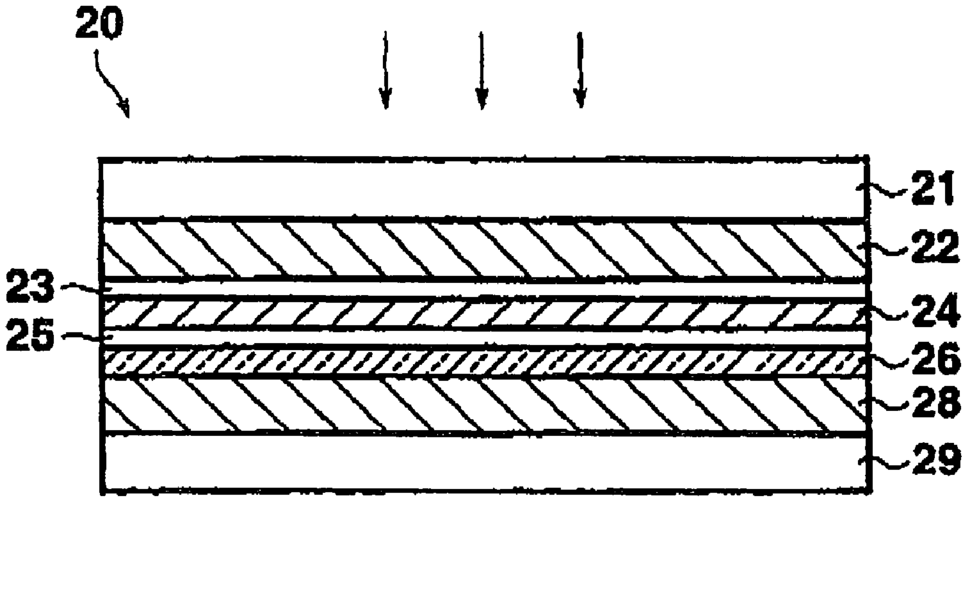
FIG. 6 illustrates a further example of the radiation image-reproducing device according to the invention.

FIG. 6 shows a different constitution of Device I (i.e., radiation image-reproducing device 20) that is composed of a support sheet 21, a radiation-absorbing phosphor layer 22, a light-transmitting electrode layer 23, a stimulable phosphor layer 24, a light-transmitting electrode layer 25, a light-collecting optical waveguide layer 26, a radiation-absorbing phosphor layer 28, and a support sheet 29.

Figure 7:
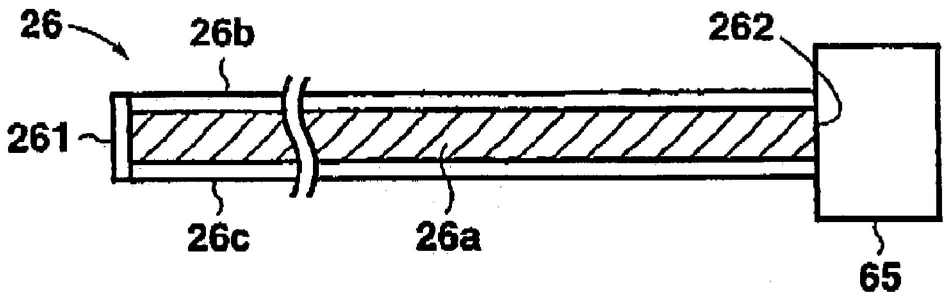
FIG. 7 is a schematic section of an example of the light-collecting optical waveguide layer.

An example of the structure of the light-collecting optical waveguide layer 26 is illustrated in FIG. 7. The light-collecting optical waveguide layer 26 comprises a core portion 26*a* of a high refractive index phosphor layer and clad portions 26*b*, 26*c* of a low refractive index layer arranged on the core portion 26*a*. Three edge portions of the waveguide layer 26 are coated with a light-reflecting material 261. The light emission from the waveguide layer 26, which is excited by absorbing a light emission from the stimulable phosphor layer, is released from the remaining one edge portion 262 and detected by a photoelectric detector 65 which is attached to the edge portion 262. The waveguide layer 26 generally has a thickness in the range of 2 to 50 μm, preferably 5 to 20 μm. A selectively reflective layer (multilayer film) may be provided on the outer surface of the low density layer.

The latent radiation image stored in the stimulable phosphor layer 24 is released by: applying to the phosphor layer 24 an electric field from the light-transmitting electrode layers 23, 25-to release a light emission; introducing the light emission into the waveguide layer so that the core portion 26*a*, which contains fluorescent substances, can absorb the light emission to emit a light in different wavelength region; guiding the emitted light through the core portion 26*a* to the edge portion 262; and detecting the emitted light by the photoelectric detector such as a detector 65 of FIG. 7.

Figure 8:
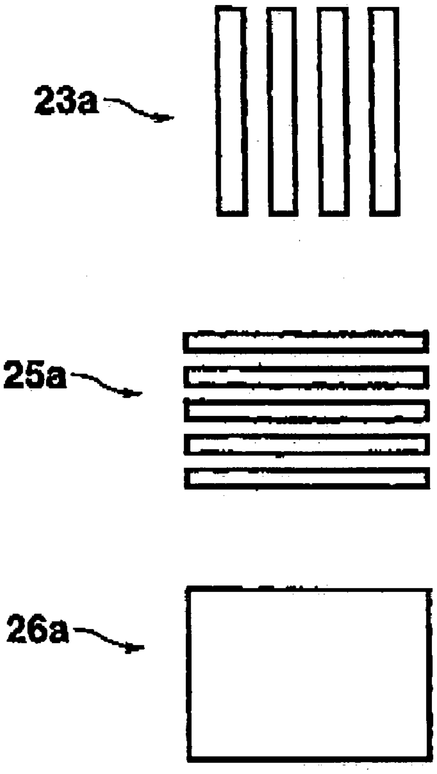
FIG. 8 shows an example of the combination of the light-transmitting electrode layers and the light-collecting optical waveguide layer which is employed in the radiation image-reproducing device according to the invention.

When the stimulation with electric field is performed by point-scanning, the two electrode layers 23, 25 and the waveguide 26 can have patterns of 23*a*, 25*a* and 26*a*, respectively, shown in FIG. 8. The electrode layers on the front side and the back side have patterns 23*a*, 25*a*, respectively, which are composed of regularly arranged strips under the condition that the strips 23*a* of the front side electrode cross the strips 25*a* of the back side electrode at a right angle. The waveguide layer has a plane surface 26*a* to receive the light emission on its whole surface.

Figure 9:
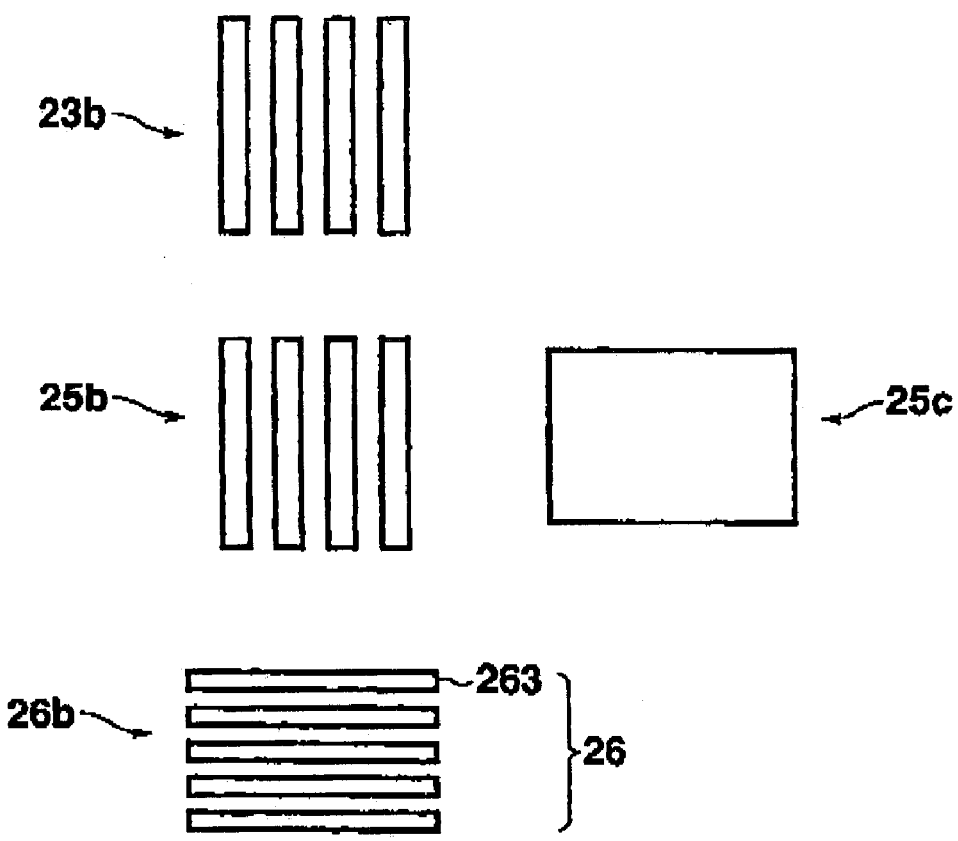
FIG. 9 shows a pattern of the combination of the light-transmitting electrode layers and the light-collecting optical waveguide layer.

When the stimulation with electric field is performed by line-scanning, the two electrode layers 23, 25 and the waveguide 26 can have patterns of 23*b*, 25*b* and 26*b*, respectively, shown in FIG. 9. The electrode layers on the front side and the back side have patterns 23*b*, 25*b* which are composed of regularly arranged strips under the condition that the strips 23*b* of the front side electrode overlap with the strips 25 of the back side electrode. The waveguide layer 26 is composed of linear light-collecting elements 26*b* (e.g., optical fibers 263) which are arranged to cross the strips 23*b* and strips 25*b* at a right angle. The light emission is collected from each linear light-collecting element. The linear light-collecting element is shielded with light-reflecting material at one edge portion and the light emission is collected from another end. Otherwise, the front side electrode layer 23 and the back side electrode layer 25 may take a plane surface 25*c* or a divided surface (not shown).

Figure 23:
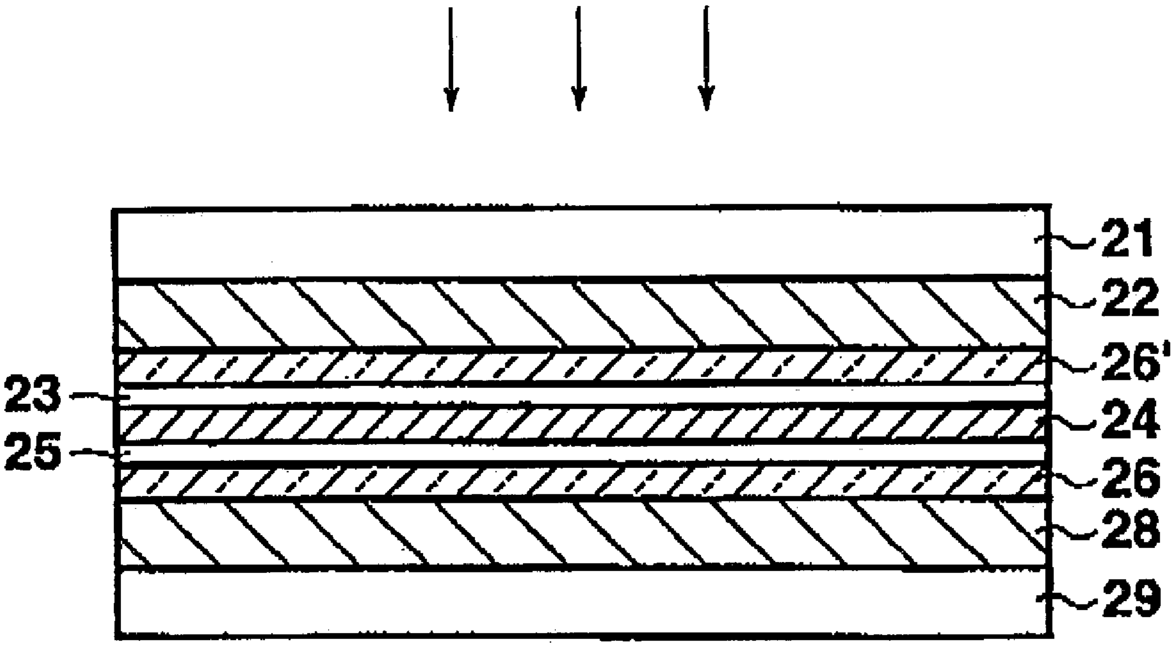

Device I may take a structure illustrated in FIG. 23 in which Device I is composed of a support sheet 21, a radiation-absorbing phosphor layer 22, a light-collecting optical waveguide layer 26', a light-transmitting electrode layer 23, a stimulable phosphor layer 24, a light-transmitting electrode layer 25, a light-collecting optical waveguide layer 26, a radiation-absorbing phosphor layer 28, and a support sheet 29.

Figure 10:
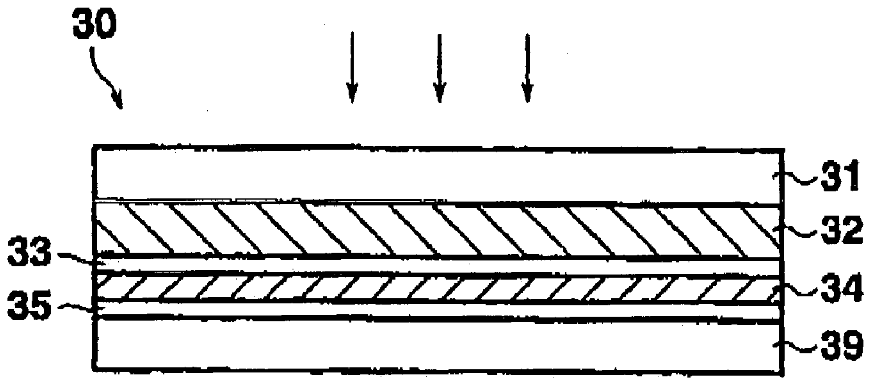
FIG. 10 illustrates a still further example of the radiation image-reproducing device according to the invention.

Further, Device II of the invention can take a structure illustrated in FIG. 10 in which Device II is composed of a support sheet 31, a radiation-absorbing phosphor layer 32, a light-transmitting electrode layer 33, a stimulable phosphor layer 34, a light-transmitting electrode layer 35, and a protective layer 39.

In FIG. 10, the two light-transmitting electrode layers 33, 35 can take the patterns 13*a*, 15*a*, respectively, of FIG. 2 in the case that the stimulation with electric field is performed by point-scanning, while the two electrode layers 33, 35 can take the patterns 13*b*, 15*b*, respectively, of FIG. 3 in the case that the stimulation with electric field is performed by line-scanning. In any cases, the light emission released from the stimulable phosphor layer 34 by the stimulation with electric field can be detected by a known detecting means such as a combination of a light-collecting guide and a photo-multiplier tube, an avalanche photodiode, or a combination of a lens array and a line sensor, for example, a selfoc lens and array and a line CCD. In FIG. 10, there can be provided an insulating layer between the stimulable phosphor layer 34 and each of the electrode layers 33, 35.

Figure 11:
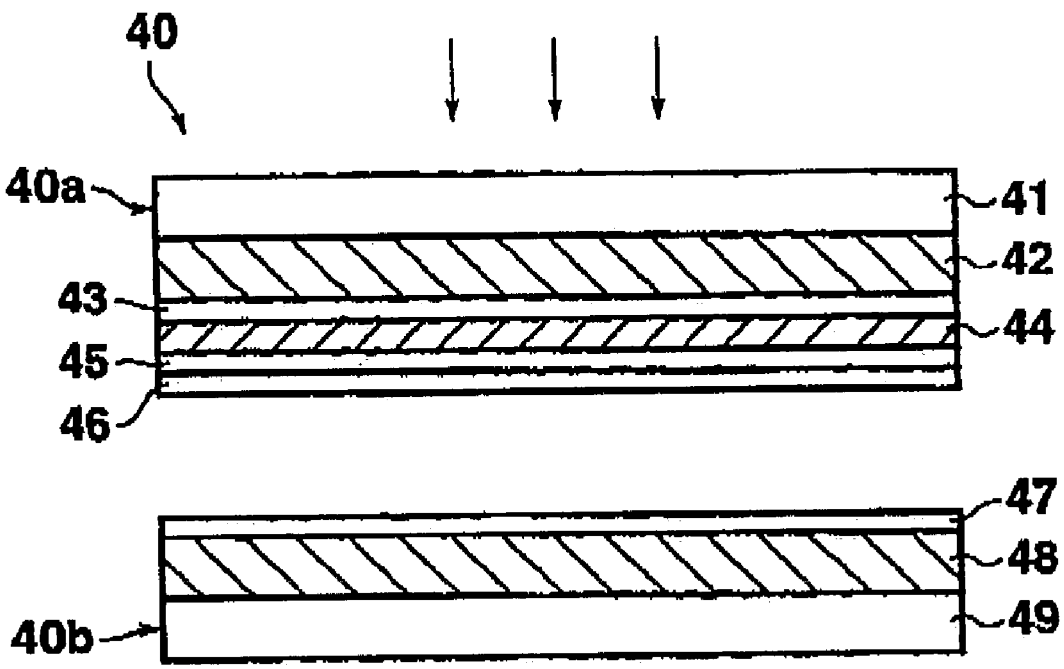
FIG. 11 illustrates an example of the radiation image-reproducing set according to the invention.

The radiation image-reproducing set of the invention can take a structure illustrated in FIG. 11 in which the image-reproducing set is composed of a radiation image storage panel 40*a* on the front side and a fluorescent sheet 40*b* on the back side. The radiation image storage panel 40*a* is composed of a substrate sheet 41, a radiation-absorbing phosphor layer 42, a light-transmitting electrode layer 43, a stimulable phosphor layer 44, a light-transmitting electrode layer 45, and a protective layer 46. The fluorescent sheet 40*b* is composed of a protective layer (or support sheet) 47, a radiation-absorbing phosphor layer 48, and a support sheet (or a protective layer) 49. The protective layer generally has a thickness in the range of approx. 1 to 20 μm, preferably in the range of 2 to 15 μm.

In FIG. 11, the two light-transmitting electrode layers 43, 45 can take the patterns 13*a*, 15*a*, respectively, of FIG. 2 in the case that the stimulation with electric field is performed by point-scanning, while the two electrode layers 43, 45 can take the patterns 13*b*, 15*b*, respectively, of FIG. 3 in the case that the stimulation with electric field is performed by line-scanning. In any cases, the light emission released from the stimulable phosphor layer 44 by the stimulation with electric field can be detected by a known detecting means as described for FIG. 10.

Figure 12:
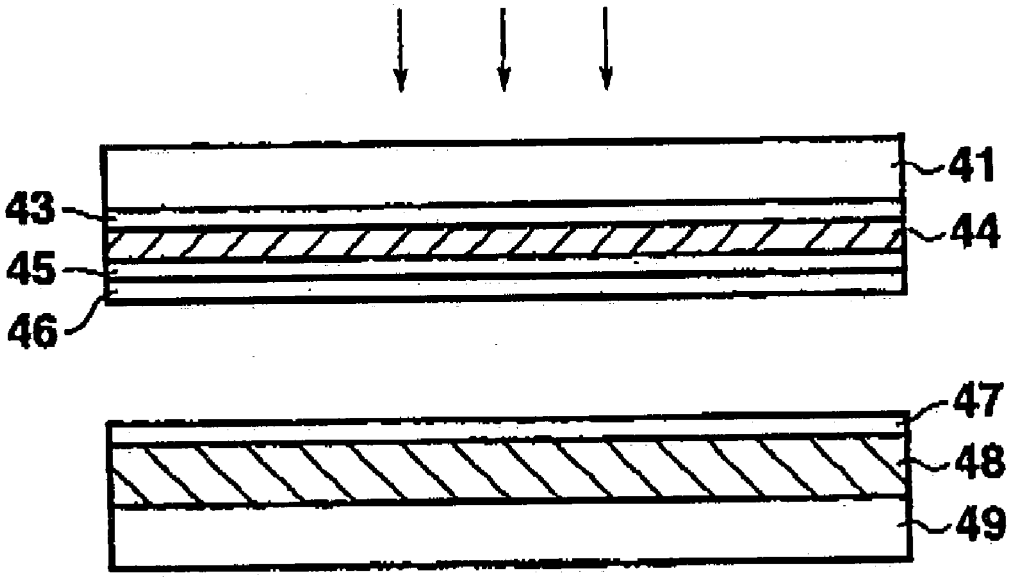
FIG. 12 illustrates another example of the radiation image-reproducing set according to the invention.

The radiation-absorbing phosphor layer 42 of the radiation image storage panel 40*a* can be omitted as is illustrated in FIG. 12, in which the radiation image reproducing set is composed of a radiation image storage panel on the front side and a fluorescent sheet on the back side. The storage panel is composed of a support sheet 41, a light-transmitting electrode layer 43, a stimulable phosphor layer 44, a light-transmitting electrode layer 45, and a support sheet (or a protective layer) 46. The fluorescent sheet is composed on a protective layer (or a support sheet) 47, a radiation-absorbing phosphor layer 48, and a support sheet (or a protective layer) 49. In FIG. 12, there can be provided an insulating layer between the stimulable phosphor layer 44 and each of the electrode layers 43, 45.

In FIGS. 1 to 13 and FIGS. 20 to 23, the application of radiation is made on the upper surface of the device or set along the direction of arrows. If desired, the application of radiation can be made directly on the bottom surface. In the latter case, the radiation-absorbing phosphor layer on the front side preferably has a thickness less than the radiation-absorbing phosphor layer on the back side. In the case of FIG. 4 and FIG. 10, the latter case is preferably.

[Stimulable Phosphor]

A representative phosphor to be incorporated into the radiation image storage layer is a stimulable phosphor which absorbs a light of the ultraviolet to visible region to store the energy of the absorbed light and, when it is stimulated by application of electric field, it releases the stored energy in the form of a stimulated emission.

The stimulable phosphor preferably employable in the radiation image storing and reproducing system of the invention absorbs a light of a violet to blue region. Examples of the preferred stimulable phosphors include ZnS:Cu, ZnS:Mn, ZnS:Pb,Cl, SrS:Eu,Sm, KI:Cu, and CdS:Ag. The stimulable phosphor is generally employed in the form of fine particles, preferably having a mean particle size of approx. 5 μm or less, more preferably 2 μm or less.

[Radiation-absorbing Phosphor]

The fluorescent sheet comprises a radiation-absorbing phosphor, which absorbs radiations such as X-rays, α-rays, β-rays, γ-rays, ultraviolet rays, neutron-rays, and their analogous rays and releases, generally, a spontaneous emission of a ultraviolet to visible region, particularly a spontaneous emission of a ultraviolet to green region. The radiation-absorbing phosphor preferably contains an atomic element corresponding to an atomic number 37 or more, preferably an atomic number of 55 to 83, as a matrix component.

Examples of the preferred radiation-absorbing phosphors include $LnTaO_4$-based phosphors (provided that impurities functioning as activators are not contained; Ln is a rare earth element), $LnTaO_4$:(Nb,Gd,Tm)-based phosphors, $Ln_2SiO_5$:Ce based phosphors, $LnAlO_3$:Ce-based phosphors, LnOX:(Tb,Tm)-based phosphors, $Ln_2O_3$:Eu-based phosphors, $Ln_2O_2S$:(Gd,Tb,Tm)-based phosphors, CsX:Na-based phosphors (X is halogen), CsX:Tl-based phosphors, CsX:Eu-based phosphors, BaFX:Eu-based phosphors, $ZnWO_4$, $CaWO_4$, and $HfP_2O_7$, and $Hf_3(PO_4)_3$.

The phosphors preferably has a density of 7.0 or more, more preferably 9.0 or more. Examples of the preferred phosphors include $LuTaO_4$, $LuTaO_4$:Nb, $Lu_2SiO_5$:Ce, $LuAlO_3$:Ce, $Lu_2O_2S$:(Gd,Tb,Tm) and its analogues, $Lu_2O_3$:(Eu,Gd,Tb,Er,Tm) and its analogues, $Gd_2O_3$:(Tb,Tm) and its analogues, $Gd_2O_2S$:Tb, $Gd_2O_2S$:(Pr,Ce), $CdWO_4$, $Gd_3Ga_5O_{12}$:(Cr,Ce), $HfO_2$, TlCl:(Be,I), and $Bi_4Ge_3O_{12}$.

Some of the preferably employed radiation-absorbing phosphors are set forth in Table 1 together with density and emission wavelength.

TABLE 1

| Radiation-absorbing phosphor | Density ($g/cm^3$) | Emission wavelength (nm) |
|---|---|---|
| $YTaO_4$ | 7.5 | 340 |
| $YTaO_4$:Tm | 7.5 | 360, 460 |
| LaOBr:Tm | 6.3 | 360, 460 |
| $YTaO_4$:Nb | 7.5 | 410 |
| CsI:Na | 4.5 | 420 |
| $LuAlO_3$:Ce | 8.4 | 365 |
| $Lu_2SiO_5$:Ce | 7.4 | 420 |
| $LuTaO_4$:Nb | 9.8 | 394 |
| $Lu_2O_2S$:Tb | 8.9 | 550 |

The above-mentioned list of the radiation-absorbing phosphors are not limitative. The radiation-absorbing phosphors are selected in consideration of matching with the first stimulation characteristics of the stimulable phosphors. The radiation-absorbing phosphor is generally employed in the form of particles, whose mean particle size preferably is in the range of approx. 1 to 20 μm.

From the viewpoint of matching, the emission spectrum of the radiation-absorbing phosphor preferably over-laps with the primary stimulating range of the stimulable phosphor at 70% or more. The range of spectrum is calculated from the range between a wavelength in a shorter portion at which the spectrum gives a strength of 10% of the peak value and a wavelength in a longer portion at which the spectrum gives a strength of 10% of the peak value.

It is preferred that a fluorescent layer or sheet placed on the front side and a fluorescent layer or sheet on the back side contain matrix components of heavy atomic elements of atomic number 37 or more which are different from each other. Particularly, the fluorescent layer of sheet to be placed on the back side contains an atomic element of the greater or equal atomic number.

[Production of Radiation Image-reproducing Device]

The radiation image-reproducing device of the invention is further described below, taking an example in which each of the stimulable phosphor layer and the radiation-absorbing phosphor layer comprises phosphor particles and a binder. Each phosphor layer can be produced on a support sheet by known processes such as those described below.

[Support Sheet]

The support sheet can preferably be a transparent or light-reflecting or light-absorbing plastic material sheet or film. Examples of the plastic materials include polyethylene terephthalate, polyethylene naphthalate, polyamide, polyimide, and aramid resin. The thickness of the support sheet generally is in the range of 50 to 1,000 μm.

The light-reflecting support sheet which reflects a primary stimulating light or a stimulated emission may contain a light-reflecting powder such as alumina powder, titanium dioxide powder, or barium sulfate powder. The support sheet may contain voids. The support sheet may contain carbon black.

[Preparation of the Phosphor Layers]

The stimulable phosphor layer or radiation-absorbing phosphor layer can be formed, for example, in the following manner which is as such known. First, the phosphor particles and a binder are placed in a solvent, and mixed well to prepare a coating liquid in which the phosphor particles are uniformly dispersed in a binder solution. As the binder, various resin materials are known and optionally usable for the invention. The ratio between the binder and the phosphor in the liquid depends on the characteristics of the phosphor and the aimed property of the phosphor layer, but generally they are employed at a ratio of 1:1 to 1:100 (binder: phosphor, by weight). The coating liquid may further contain various additives such as a dispersing agent (for promoting dispersing of the phosphor particles), a plasticizer (for improving binding between the phosphor particles and the binder), an anti-yellowing agent (for inhibiting yellowing of the phosphor layer), a hardening agent and a crosslinking agent.

The coating liquid thus prepared is evenly coated on a support (e.g., glass plate, metal plate, plastic sheet) by known coating means (such as doctor blade, roll coater, and knife coater), and dried to form a phosphor layer. The phosphor layer is once formed on a temporary sheet and then transferred onto the genuine support. The phosphor layer can contain acicular phosphor particles which are arranged vertically on the surface of the support.

The radiation-absorbing phosphor layer and the stimulable phosphor layer can be independently a deposited phosphor layer or a sintered phosphor layer.

The deposited phosphor layer can be formed on a support sheet by the following vapor deposition method. The phosphor or an appropriate phosphor source composition is vaporized and deposited on a support sheet or a substrate sheet to form a phosphor layer by means of electron beam application, resistance heating, sputtering, chemical vapor deposition (CVD) or the like. In the electron beam application procedure, an electron beam radiated by an electric gun is applied to an evaporation source. The evaporation source is a phosphor or a phosphor-forming composition such as that contains a matrix component of phosphor and an activator component of phosphor. The phosphor-forming composition can be divided into two or more portions, and each portion is employed as an independent evaporation source. Upon application of electron beam, the phosphor or phosphor-forming composition is heated and vaporized. The vapor is directly or upon reaction of the respective components deposited on a support sheet (or an appropriate substrate) to form the desired phosphor layer. The rate of deposition of the phosphor vapor generally is in the range of 0.1 to 1,000 μm/min., preferably 1 to 100 μm/min. Two or more phosphor layers can be deposited on the support sheet by repeating the application of electric beam. If desired, the support sheet or substrate can be cooled or heated when the vapor deposition is performed. The deposited phosphor layer can be further heated, after the deposition is complete. The phosphor layer formed by the vapor deposition method comprises prismatic crystals having cracks between adjoining prismatic crystals. The cracks serve to keep a light emission from scattering on the plane direction.

[Partitions in Phosphor Layer]

The radiation-absorbing phosphor can be placed within areas enclosed partitions so as to have asymmetric characteristics and define diffusion of a released light within the area. Since the radiation-absorbing phosphor layer is made relatively thick, the provision of the partitions is effective to prevent the released light from diffusing on the plane of the phosphor layer.

The phosphor layer having a set of partitions and divided phosphor areas in which a phosphor is incorporated is already known.

Figure 13:
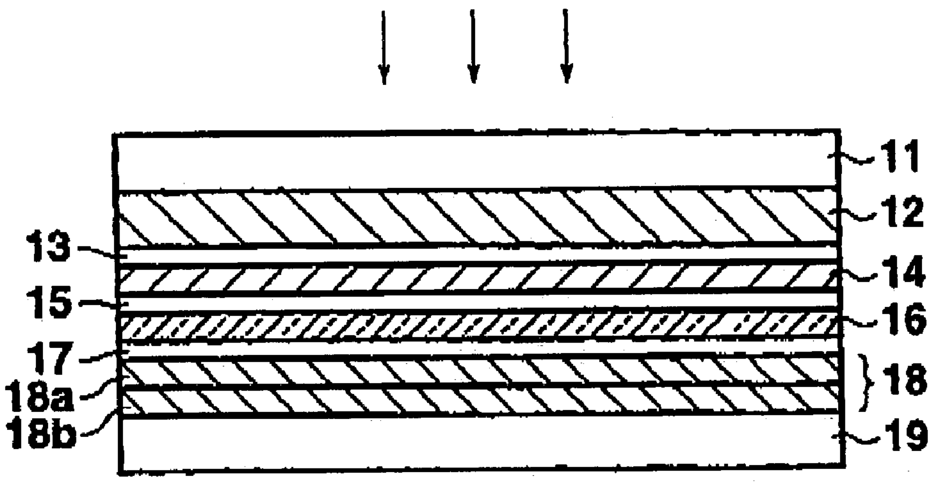
FIG. 13 illustrates a still further example of the radiation image-reproducing device according to the invention.

Otherwise, the radiation-absorbing phosphor layer can be made of a fiber plate and a phosphor layer of acicular phosphor crystals, as is illustrated in FIG. 13. In FIG. 13, the radiation-absorbing phosphor layer 18 is composed of a fiber plate 18*a* and an acicular phosphor crystal film 18*b* which is arranged under the fiber plate 18*a*. The acicular phosphor film 18*b* contains cracks which function as partitions. The fiber plate 18*a* is an optical plate in which several millions of optical fibers of several μm are combined in the direction of the depth of the plate. The light of ultraviolet to visible region emitted by the radiation-absorbing phosphor layer passes through the fiber plate to reach the stimulable phosphor layer almost with no diffusion on the plane direction.

In the structure of FIG. 13, the radiation-absorbing phosphor layer 18 on the back side is composed of a fiber plate 18*a* and an acicular phosphor crystal film 18*b*, while the radiation-absorbing phosphor layer on the front side is a simple phosphor layer. This structure is favorably employed for enhancing sharpness of the reproduced radiation image. In order to enhance the sharpness, it is also favorable to place the partitions in the radiation-absorbing phosphor layer, particularly on the back side.

[Light-transmitting Electrode Layer]

The light-transmitting electrode layer can be placed directly on the radiation-absorbing phosphor layer or stimulable phosphor layer by vacuum deposition or sputtering of appropriate material such as aluminum metal or ITO (indium-tin oxide). Otherwise, an independently prepared light-transmitting electrode film can be placed on the phosphor layer. As described hereinbefore, the light-transmitting electrode layer is a transparent electrode layer or a metallic electrode layer having a mesh or fine strip pattern. The metallic electrode layer having a mesh or fine strip pattern is favorably employed as the light-transmitting electrode layer to be placed between the stimulable phosphor layer and the radiation-absorbing phosphor layer. The pattern of the metallic electrode layer can be produced by etching. The light-transmitting layer generally transmits light emissions generated in the radiation-absorbing phosphor layer and the stimulable phosphor layer at a transmission (per one layer) of 50% or higher, preferably 70% or higher, more preferably 90% or higher.

[Stimulable Phosphor Layer]

On the light-transmitting electrode layer is formed a stimulable phosphor layer comprising stimulable phosphor particles and a binder. The binder preferably has a high permittivity. Examples of the preferred binders include organic or inorganic material having a high permittivity and a known organic binder containing fine inorganic particles of a high permittivity. The organic material having a high permittivity can be a cyanocellulose resin. Examples of the fine inorganic particles include particles of $BaTiO_3$ and particles of $SrTiO_3$.

In the present invention, the stimulation of the latent radiation image in the stimulable phosphor layer is performed not with application of a stimulating light but with application of electric field. Accordingly, there is no need of taking the scattering of stimulating light in the phosphor layer into consideration, and hence the stimulable phosphor particles are preferably present densely in the layer.

The stimulable phosphor layer can be produced in the same manner as described for the production of the radiation-absorbing phosphor layer.

When each of the radiation-absorbing phosphor layer and a stimulable phosphor layer comprises phosphor particles and a binder. Each of a weight ratio of the binder to phosphor (binder/phosphor: $B_1/P_1$) in the radiation-absorbing phosphor layer and a weight ratio of the binder to phosphor (binder/phosphor: $B_2/P_2$) in the stimulable phosphor layer preferably is 1 or less. Moreover, the former ratio preferably is less than the latter ratio, that is $1 \leqq B_2/P_2 \leqq B_1/P_1$.

The $B_1/P_1$ in the radiation-absorbing phosphor layer is preferably in the range of 1/8 to 1/50, more preferably 1/15 to 1/40. The $B_2/P_2$ in the stimulable phosphor layer is preferably in the range of 1/1 to 1/20, more preferably 1/2 to 1/10.

[Particle Size]

It is preferred that a mean particle size of the phosphor in the radiation-absorbing phosphor layer is equal to or larger than that of the stimulable phosphor in the stimulable phosphor layer. More preferably, the mean particle size of the phosphor in the radiation-absorbing phosphor layer is as much as twice or larger, as compared with that of the stimulable phosphor in the stimulable phosphor layer.

The mean particle size of the phosphor in the radiation-absorbing phosphor layer generally is in the range of 1 to 20 μm, preferably 2 to 10 μm. The mean particle size of the stimalable phosphor in the stimulable phosphor layer generally is in the range of 0.2 to 20 μm, preferably 0.5 to 5 μm. The stimulable phosphor may have a more smaller mean particle size.

Both phosphors can have a particle size distributions such as those described in Japanese Patent Provisional Publications No. 2000-284097, No. 2000-192030, and No. 58-182600.

[Absorption Coefficient of Phosphor]

From the viewpoint of improvement of radiation image quality, the radiation absorption coefficient of the radiation-absorbing phosphor layer and the absorption coefficient of absorbing a light (i.e., a primary stimulating light) emitted by the radiation-absorbing phosphor layer preferably satisfy the following relationship:

Absorption coefficient of absorbing primary stimulating light>Radiation absorption coefficient of the radiation-absorbing phosphor layer×2

More preferably is as follows:

Absorption coefficient of absorbing primary stimulating light>Radiation absorption coefficient of the radiation-absorbing phosphor layer×5

The absorption coefficient of absorbing primary stimulating light is a virtual coefficient (or apparent coefficient) defined as follows.

It is assumed that the phosphor layer has a uniform thickness (d), a light reflectivity of the phosphor layer when the phosphor layer is placed independently in a space is (r), and a light transmittance is (t). The light reflectivity (r) is determined using a standard white board. A light reflectivities ($R_w$ and $R_b$) of a system surrounding the phosphor layer which is placed adjacent to the white board (light reflectivity $r_w$) and to the black board (light reflectivity $r_b$) under the condition that the white or black board is placed on the side of the back surface of the phosphor layer are calculated using the following equations:

$$R_w = r + r_w \times t^2 \quad R_b = r + r_b \times t^2$$

The virtual light absorption coefficient K of the phosphor layer can be calculated, assuming that the coefficient K decreases logarithmically along the thickness (d) of the phosphor layer.

$$K = -(1/d) \times \ln [t/(1-r) = -(1/d) \times \ln [\{(R_w - R_b)/(r_w - r_b)\}^{1/2} / \{1 - R_w + r_w(R_w - R_b)/(r_w - r_b)\}]$$

The radiation absorption coefficient can be calculated by multiplying a mass energy absorption coefficient $\mu_{en}/\rho$ by a density ρ of the phosphor layer. The information is available at http://phyics.nist.gov/PhysRefdata/XrayMassCoef/cover.html. The density ρ of phosphor layer is determined by multiplying a density of the phosphor per se by a ratio of phosphor in the layer.

In order to reproduce a radiation image of high quality, the radiation-absorbing phosphor preferably has a mean density of 6.0 g/cm$^3$ or higher, or the radiation-absorbing phosphor layer has a density of 4.0 g/cm$^3$ or higher.

If the mean particle diameter of the stimulable phosphor is not sufficiently small, as compared with the thickness of the stimulable phosphor layer, for instance, under a condition of $d/10 < a < d$ [d=thickness of phosphor layer (μm), a=mean particle diameter of phosphor particles (μm)], a thin stimulable phosphor layer and a thick radiation-absorbing phosphor layer and an electrode layer in between can be preferably produced at the same time utilizing simultaneous multiple casting or coating method. By the simultaneous multiple casting, a thin stimulable phosphor layer such as of a thickness of 5 to 20 μm can be produced.

[Photoelectric Conversion Layer]

The photoelectric conversion layer which generates an electric current upon receiving a light emission from the stimulable phosphor layer can be made of known material such as amorphous silicon. A photoelectric conversion layer made of organic material is also known. This organic photoelectric conversion layer can be a function-separate type in which a electron-generating layer is placed on an electron transfer layer or a single unit type. Both are employable. Electron-accepting materials such as metals or their compounds (e.g., selenium, silicon, sulfur, cadmium sulfate, and zinc sulfide) and dyes such as phthalocyanine dyes and perylene dyes which are disclosed in Japanese Patent Provisional Publications No. 2000-298361 and 22-198426, ultraviolet light-absorbing compounds, and oxidation inhibitors can be incorporated. The photoelectric conversion layer can be directly formed on the light-transmitting electrode layer by vacuum deposition, sputtering or coating. Otherwise, a separately prepared photoelectric conversion layer can be combined to the light-transmitting electrode layer by calendering. The photoelectric conversion layer can be prepared once on a temporary support and then transferred onto the electrode layer. When the photoelectric conversion layer is placed between the radiation-absorbing phosphor layer and the stimulable phosphor layer, the conversion layer preferably absorbs the light emission released by the radiation-absorbing phosphor layer as less as possible, generally 50% or less, preferably 30% or less, more preferably 10% or less.

It is preferred that the photoelectric conversion layer absorbs the light emission released by the stimulable phosphor layer as much as possible. However, a photoelectric conversion layer capable of absorbing the light emission at a level of several % may be employed if the conversion layer can generate an electric current at an enough level when the electric field is applied.

[Insulating Layer]

The insulating layer which can be employed for electrically separating the light-transmitting electrode layer from the stimulable phosphor layer or one light-transmitting electrode layer from other light-transmitting electrode layer can be made of insulating material such as silicon dioxide, silicon nitride, or aluminum oxide and can be formed on an appropriate surface by vacuum deposition, sputtering, or the like. Alternatively, the insulating layer can be made by coating or spray-drying organic or inorganic insulating material or composite material. Sol-gel process can be also employed.

[Light-collecting Optical Waveguide Layer]

As is illustrated in FIGS. 6 and 7, a light-collecting optical waveguide layer can be incorporated into the radiation image-reproducing device of the invention in place of the combination of the photoelectric conversion layer and a light-transmitting electrode layer. The waveguide layer can be prepared, for instance, by coating a low refractive index polymer (e.g., acrylic resin or fluororesin) on a temporary support sheet having a releasable coat to give a clad; producing on the clad a core layer comprising a high refractive index polymer (e.g., styrene resin, epoxy resin, or acrylic resin containing inorganic nano-size particles) and a phosphor of nano-size particles or an organic phosphor which absorbs the light emission released by the stimulable phosphor and emits a fluorescent light; and placing a light-reflecting material on the three edge portions of the resulting composite structure to give a diffuse reflection structure or a specular reflection structure; separating the resulting structure from the temporary support sheet; and placing the separated structure on the light-transmitting layer with adhesive. The light-reflecting material can be a thin film of a binder material containing a light-reflecting material such as titanium dioxide, yttrium oxide, zirconium oxide, or aluminum oxide (i.e., alumina) or an aluminum-deposited film. On the outer surface of the low refractive layer (clad layer), the below-mentioned selective reflection layer (multilayer film) can be placed.

If the light-collecting optical waveguide layer is made of a great number of linear light-collecting elements such as optical fibers (see **26*b* of FIG. 9**), the optical fibers containing a phosphor layer that is capable of absorbing the light emission released by the stimulable phosphor layer and emits a fluorescent light can be arranged in parallel after shielding one end with light-reflecting material and combined by means of binder. Otherwise, the bundle of the optical fibers are fixed on the surface of the radiation-absorbing phosphor layer.

[Selective Reflection Layer]

A selective reflection layer can be placed between adjoining layers such as between the radiation-absorbing phosphor layer and the stimulable phosphor layer. The selective reflection layer allows passage of the light emission released by the radiation-absorbing phosphor layer and reflects the light emission released by the stimulable phosphor layer.

The selective reflection layer can be produced by making a film of plural layers on a thin film. The film of plural layers (such as a interfering multi-layered film) can be produced by placing two material layers having different refractive indexes alternately and a thickness of approximately ¼ λ (approx. 50 to 200 nm), and per se is well known. The low refractive index material can be $SiO_2$ or $MgF_2$, while the high refractive index material can be $TiO_2$, $ZrO_2$, $Ta_2O_5$, or ZnS.

The selective reflecting layer can be formed on a thin polymer film (thickness: 4 to 20 μm) by sputtering, depositing or ion-plating the materials of the multi-layered film one on another.

[Diffuse-reflection Layer]

A diffuse-reflection layer is provided between the front-side support sheet and the radiation-absorbing phosphor layer. The diffuse-reflection layer reflects the light emission released by the radiation-absorbing phosphor layer so as to increase the amount of light emission entering the stimulable phosphor layer. Thus, the provision of the diffuse-reflection layer is effective to increase the sensitivity of the radiation image-reproducing device.

The diffuse-reflection layer contains a light-scattering material such as titanium dioxide, yttrium oxide, zirconium oxide, or alumina and reflects a light emitted by the fluorescent layer.

The diffuse-reflection layer containing titanium dioxide is preferably employed in combination of a radiation-absorbing phosphor $Gd_2O_2S$:Tb or $Lu_2O_3$:Tb, or the like. If the radiation-absorbing phosphor emits a light of shorter wavelength such as approx. 430 nm or shorter, alumina, yttrium oxide or zirconium oxide showing no absorption in that area is preferably employed.

The diffuse reflection layer has a function of giving a high reflection ratio at a thinner thickness. Accordingly, the mean size of the light-reflecting particles generally is in the range of 0.1 to 0.5 μm, preferably 0.1 to 0.4 μm. The filling factor of the light-reflecting particles in the diffuse reflection layer is generally in the range of 25 to 75%, preferably not less than 40%. The diffuse reflection layer can be produced by coating a dispersion of the light-reflecting particles in a binder solution on a support sheet and drying the coated dispersion.

In place of providing the diffuse-reflection layer, the support can contain the light-reflecting material so as to serve as the diffuse-reflection layer.

If desired, an auxiliary layer such as a light-absorbing layer, an adhesive layer, or an electroconductive layer can be provided to the radiation image storage panel.

[Coloring]

One or more layers of the radiation image-reproducing device can be colored with a colorant which partially absorbs at least one of the light emission released from the radiation-absorbing phosphor layer and/or a light emission released by the stimulable phosphor layer. Such colorants are well known. However, if the light emission released by the stimulable phosphor layer is detected by a photomultiplier, the colorant which absorbs the light emission is not preferred.

[Protective Layer]

The radiation image-reproducing device of the invention can have a protective layer on one surface or on both surfaces. The protective layer can be produced in consideration of the protective layer for the known radiation image storage panels.

[Sealing]

The radiation image-reproducing device and the radiation image-reproducing set according to the invention may have a sealing layer so that the device and set can have an increased moisture resistance. The moisture-resistant sealing layer can be produced using a thin metal film such as aluminum film or magnesium-alloy film; a multi-layer inorganic material film comprising SiC, $SiO_2$, $Si_3N_4$, Si oxynitride, or alumina; a polymer film comprising cellulose acetate, nitrocellulose, polymethyl methacrylate, polyvinyl butyral, polyvinyl formal, poly-carbonate, polyester, polyethylene terephthalate, polyethylene, polypropylene, polyvinylidene chloride, polyamide, polyethylene tetrafluoride, polyethylene trifluoro-chloride, a copolymer of polyethylene tetrafluoride and polyethylene hexafluoride, a copolymer of vinylidene chloride and vinyl chloride, a copolymer of vinylidene chloride and acrylonitrile, or polyimide; a metal oxide-deposited resin film; or a glass. The moisture-sealing layer can be placed on the upper surface, the lower surface, and/or peripheral edge portions. The edge portions can be covered with silicon resin, epoxy resin, or phenol resin.

[Radiation Image-reproducing Method]

The radiation image-reproducing method of the invention is described below with reference to FIGS. 1, 2 in which a radiation image-reproducing device (Device I) having a photoelectric conversion layer and FIG. 14 in which an apparatus for reproducing a radiation image from the device by means of point-scanning.

A radiation image information (i.e., information concerning two-dimensional distribution of radiation or spatial energy distribution of radiation) is recorded in the radiation image-reproducing device 10 of FIG. 1. In more detail, a subject is placed between the radiation image-reproducing device and a radiation source such as an X-ray generator, and the radiation is applied onto the subject. Examples of the radiations employable for the radiation image reproduction include ionization radiations such as X-rays, α-rays, β-rays, γ-rays, and ultraviolet rays and neutron-rays. If the neutron-rays are employed, the radiation-absorbing phosphor preferably contains Gd, $^{10}B$ or $^{6}Li$ in the matrix or in the form of a compound of such element.

The radiation passing through the subject or scattered or diffracted by the object is applied onto the radiation image-reproducing device 10 on the support side. A portion of the applied radiation is absorbed by the radiation-absorbing phosphor layer 12 and converted into a light emission (i.e., spontaneous emission, preferably in the ultraviolet to visible region). The light emission passes the light-transmitting electrode layer 13 to enter the stimulable phosphor layer 14, in which the light emission is absorbed and its energy is stored in the form of a latent radiation image of a two-dimensional energy distribution corresponding to the subject.

The radiation having passed the radiation-absorbing phosphor layer 12 and the light-transmitting electrode layer 17 is then absorbed by the radiation-absorbing phosphor in the radiation-absorbing phosphor layer 18 which is in turn converted into a light emission (preferably in the ultraviolet to visible region). Most of the light emission passes the photoelectric conversion layer 16 and enter the stimulable phosphor layer 14 in which the light emission is absorbed and its energy is stored in the form of a latent radiation image. Thus, the stimulable phosphor layer 14 is expposed to the light emission coming from the front side as well as the light emission coming from the back side.

The application of radiation can be made on the reverse side of the radiation image-reproducing device. If the subject per se emits a radiation such as β-rays, no radiation source is required.

Figure 14:
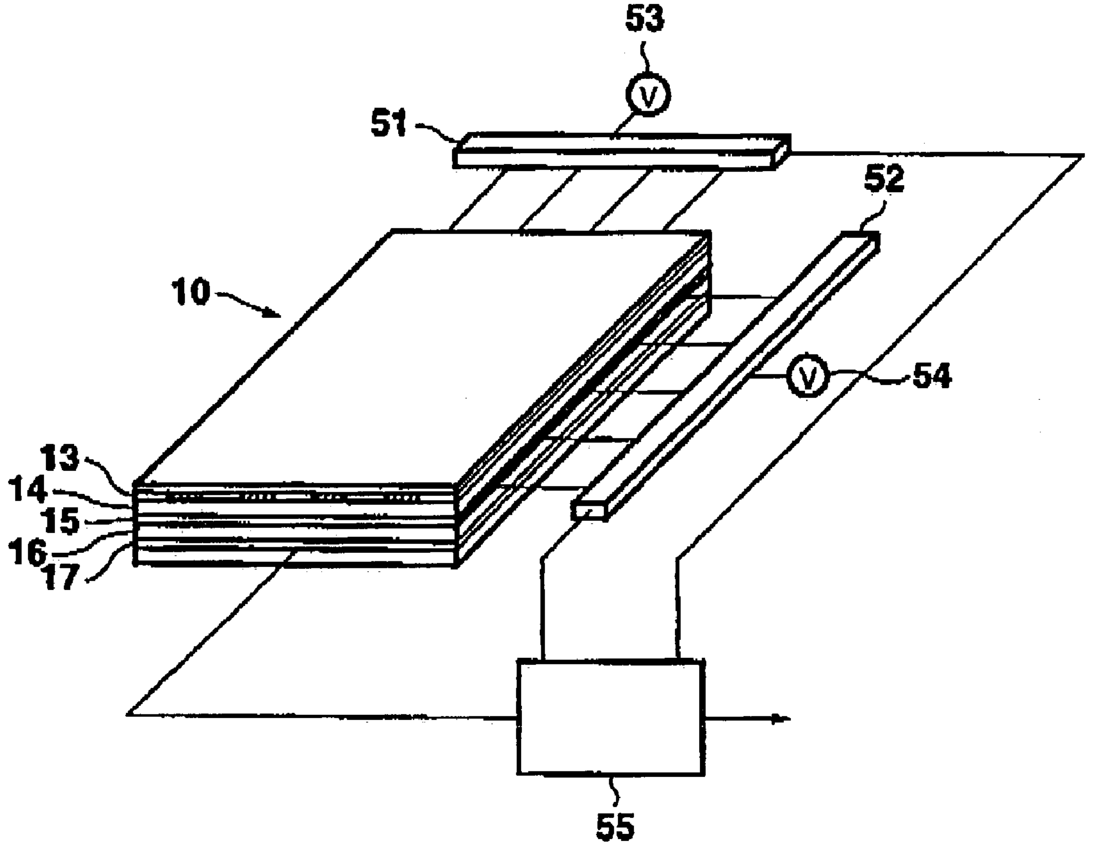
FIG. 14 illustrates an example of the two-dimensional light-detecting device (i.e., reading device) which is employable in the radiation image-reproducing method according to the invention.

Afterwards, the two-dimensional radiation energy distribution recorded in the reproducing device is detected using the apparatus illustrated in FIG. 14.

In FIG. 14, each electrode strip of the front side light-transmitting electrode layer 13 is connected to a X-direction control circuit 51 of the apparatus, while each electrode strip of the back side light-transmitting electrode layer 15 is connected to a Y-direction control circuit 52. The electrode 17 of the photoelectric conversion layer is connected to a signal-processing unit 55.

When an electric voltage is applied to the stimulable able phosphor layer 14 from the voltage sources 53, 54 via the control circuits 51, 52, the stimulable phosphor in the phosphor layer 14 is stimulated and releases a light emission corresponding to the stored radiation image (i.e., latent radiation image having radiation energy distribution). The application of electric voltage can be made in the form of alternate current pulse or direct current pulse, and further can be made in the form of a single pulse or plural pulses. Since the application of the electric field to the stimulable phosphor layer 14 is controlled two-dimensionally (X direction and Y direction) by the control circuits 51, 52, a small area of the phosphor layer in which the electrode 13 and the electrode 15 meets with each other only is excited with electric field, and release a stimulated emission. The stimulated emission subsequently passes the light-transmitting layer 15 to enter the photoelectric conversion layer 16 and is converted into an electric current in the conversion layer 16. The generated electric current is output to the signal processing unit 55 via the electrode layer (for the conversion layer) 17. The control circuits 51, 52 are controlled by the signal processing unit 55. Thus, the stimulated emission is successively detected to give a series of electric signals.

In the signal processing unit 55, the electric signals are processed according to the predetermined processing modes such as addition and subtraction to output a series of signals corresponding to a radiation image to be reproduced. The radiation image signals are then processed in an image display apparatus (not shown) to give a visible radiation image. The image display apparatus may be CRT, a liquid crystal display, an electro-luminescence display, a field emission display, or a plasma display panel. Otherwise, the radiation image can be reproduced on a photographic film or a thermographic film. The processed radiation image signals can be once stored in a memory device such as optical disc or magnetic disc.

To the whole surface of the stimulable phosphor layer 14 of the radiation image-reproducing device 10 is applied an electric field by the voltage sources 53,54 via the electrodes 13,15, so that the remaining radiation image can be erased. Thus, the radiation image-reproducing device 10 is prepared to be subjected to the next radiation image-reproducing procedures. The erasure can be made by irradiation with a light emitted by a sodium lamp, a florescent lamp, an infrared lamp, LED, EL panel, or the like. A combination of application of electric field and application of light can be employed for erasing the radiation image remaining in the stimulable phosphor layer.

Figure 15:
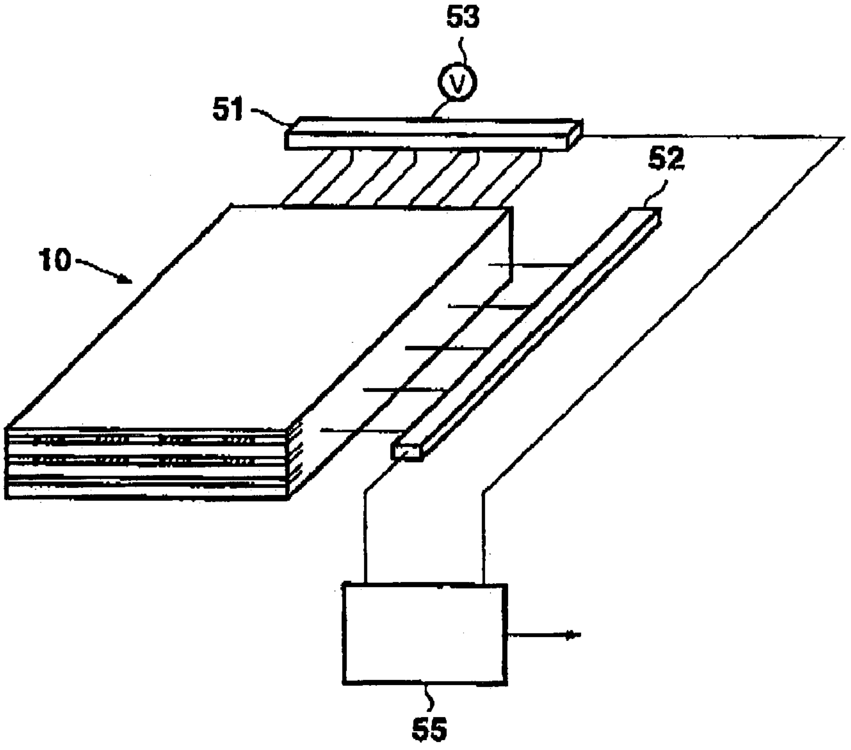
FIG. 15 illustrates another example of the reading device which is employable in the radiation image-reproducing method according to the invention.

In the case that the radiation image-reproducing device of FIG. 1 or 3 for line-scanning, the reproducing or reading of the latent radiation image from the stimulable phosphor layer can be performed using the apparatus shown in FIG. 15.

In FIG. 15, each of the front side light-transmitting electrode layer 13 and the back side light-transmitting electrode layer 17 of the reproducing device 10 is connected to the X-direction control circuit 51 and Y-direction control circuit 52. The electrode covers the whole surface of the photoelectric conversion layer.

When an electric voltage is applied to the stimulable phosphor layer 14 from the voltage source 53 via the X-direction control circuits 51, the stimulable phosphor in the phosphor layer 14 is stimulated and releases a light emission corresponding to the stored radiation image. Thus, the application of electric field to the stimulable phosphor layer 14 is made one-dimensionally only in the X-direction by the control circuit 51. Accordingly, the phosphor layer 14 is stimulated only in the linear areas corresponding to the electrode strips of the electrode layer 13 to release a stimulated emission. The stimulated emission subsequently passes the light-transmitting electrode layer 15 to enter the photoelectric conversion layer 16 and is converted into an electric current in the conversion layer 16. The generated electric current is output in series under control by the Y-direction control circuit 52 to the signal processing unit 55 via the electrode layers (for the conversion layer) 17. The control circuits 51, 52 are controlled by the signal processing unit 55. Thus, the stimulated emission is successively detected to give a series of electric signals.

Figure 16:
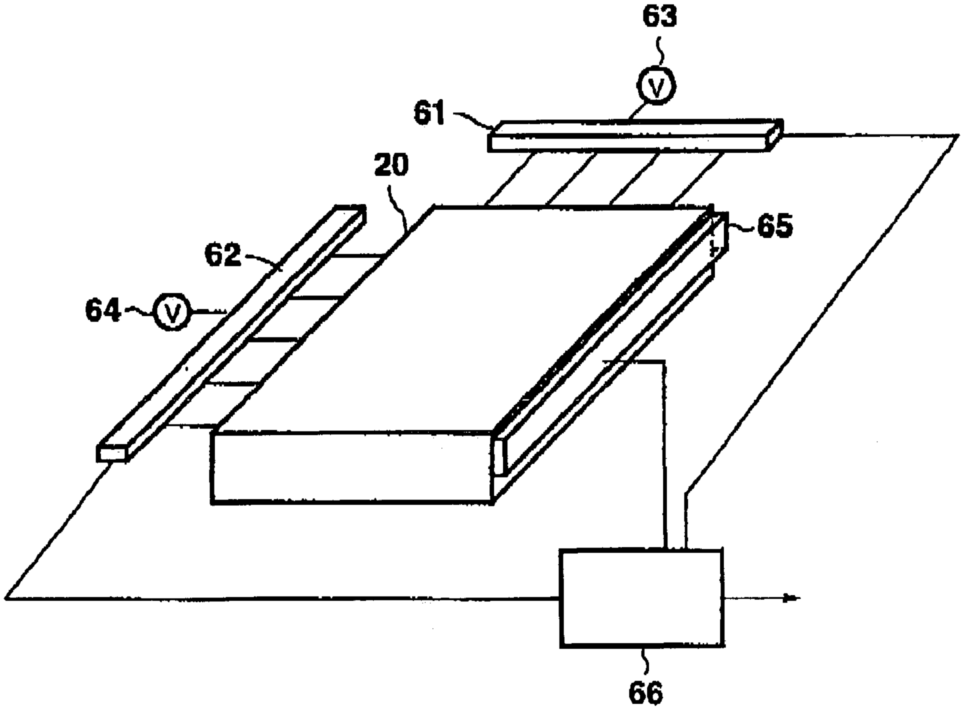

In the case that the radiation image-reproducing devices of FIGS. 6 to 8 which have a light-collecting optical waveguide layer for point-scanning is employed, the radiation image-reproducing or reading can be performed in the apparatus illustrated in FIG. 16.

In FIG. 16, the front side light-transmitting electrode layer 23 of the radiation image-reproducing device 20 is connected to the X-direction control circuit 61 of the apparatus, while the back side light-transmitting electrode layer 15 is connected to the Y-direction control unit 62. When the electric voltage generated in the voltage sources 63,64 is applied to the stimulable phosphor layer 24 under two-dimensional control by the X-direction control circuit 61 and the Y-direction control circuit 62, the stimulable phosphor in the small area to which the electric field is applied generate a stimulated emission. The stimulated emission then passes the light-transmitting electrode layer 25 to enter the waveguide layer 26. In the waveguide layer, the stimulated emission is absorbed to generate an emission to be guided horizontally to one end 262 under repeated total reflection. The emission is then released from the end 262 and received by the light detector 65. In the detector 65, the emission is photoelectrically converted in time series to be supplied to the signal processing unit 66. The detector 65 can be a photomultiplier or a photodiode and divided into plural portions.

Figure 17:
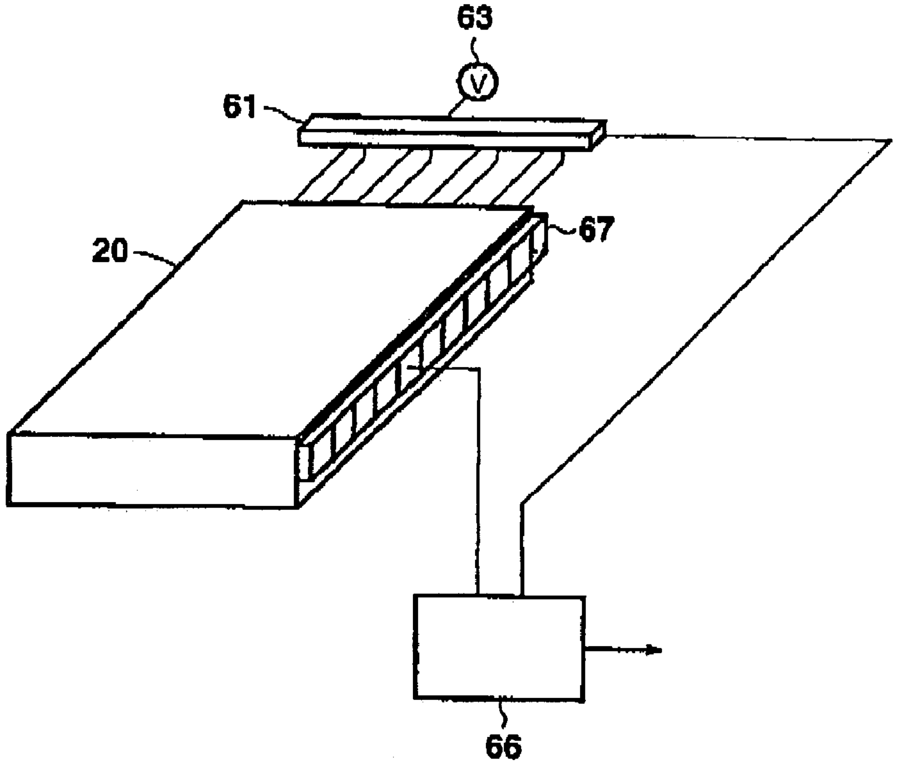

In the case that the radiation image-reproducing device of FIG. 6 or 9 for line-scanning, the reproducing or reading of the latent radiation image from the stimulable phosphor layer can be performed using the apparatus shown in FIG. 17.

In FIG. 17, both of the front side light-transmitting electrode layer 23 and the back side light-transmitting electrode layer 25 of the reproducing device 20 are connected to the X-direction control circuit 61.

When an electric voltage is applied to the stimulable phosphor layer 24 from the voltage source 63 via the X-direction control circuits 61, the stimulable phosphor in the phosphor layer 24 is stimulated and releases a light emission corresponding to the stored radiation image. Thus, the application of electric field to the stimulable phosphor layer 24 is made one-dimensionally only in the X-direction by the control circuit 51. Accordingly, the phosphor layer 24 is stimulated only in the linear areas corresponding to the electrode strips of the electrode layer to release a stimulated emission. The stimulated emission subsequently passes the light-transmitting electrode layer 25 to enter the light-collecting element 263 of the light-correcting optical waveguide layer 26. In the light-collecting element, the stimulated emission is absorbed to generate an emission to be guided horizontally to one end under repeated total reflection. The emission is then released from the end and received by the light detector 67. In the detector 67, the emission is photoelectrically converted one-dimensionally to be supplied to the signal processing unit 66. The one-dimensional detector 67 can be a line sensor comprising a large number of aligned solid-state image sensor elements.

In the radiation image-reproducing apparatus shown in FIGS. 14 to 17, the second stimulation for releasing the emission from the stimulable phosphor layer and the detector is fixed to the device. Accordingly, no moving parts are involved, and a relatively small-sized and low-price image-reproducing apparatus, which can be made potable, can be designed. For instance, if the control circuits and the signal-processing unit of the apparatus of FIG. 14 is encased in a cassette, the desired. digital signals corresponding to the radiation image can be directly obtained by connecting the cassette to an electric source. If the electric source also is encased in the cassette, no connection to the outer electric source is required. Further, the signals can be transmitted without wire.

In the invention, the point-scanning or line-scanning is optionally chosen in consideration of the response rate of the stimulable phosphor employed in the radiation image-reproducing device so that the desired image information can be obtained at a practically satisfactory rate.

Further, the procedure for application of radiation to the device and the procedure for reproducing the radiation image can be performed alternately. Furthermore, a moving radiation image can be processed by intermittently performing the erasure step or comparing the radiation image data in time series.

If the large surface area of the photoelectric conversion layer is troublesome in the signal response in the case of point-scanning, the electrode layers for the conversion layer can be divided. If the stimulated emission is detected from the whole surface of the conversion layer, its afterglow may disturb reproduction of the radiation image. In this case, the reading rate can be increased to reduce adverse effect of the afterglow.

Figure 18:
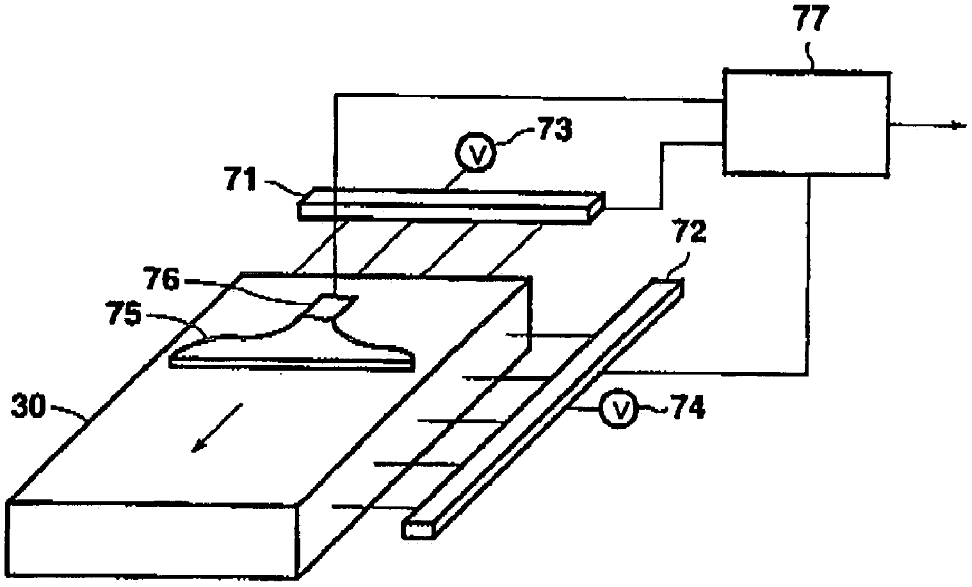

The radiation image-reproducing device which is designed for point-scanning but has neither photoelectric conversion layer nor light-collecting optical waveguide layer (FIGS. 10 & 2) can be utilized in combination with the apparatus of FIG. 18 for reproducing the radiation image. In the apparatus of FIG. 18, the image-reproducing is performed from the side of the support sheet (protective layer) 39 of the device 30.

In FIG. 18, the front side light-transmitting electrode layer 33 of the device 30 is connected to the X-direction control circuit 71, while the back side light-transmitting electrode layer 35 is connected to the Y-direction control circuit 72. When the electric voltage generated in the voltage sources 73,74 is applied to the stimulable phosphor layer 34 under two-dimensional control by the control circuits for X- and Y-directions 71,72, the stimulable phosphor in the small area of the stimulable phosphor layer 34 to which the electric voltage is applied is stimulated with the electric field and releases a stimulated emission corresponding to the stored energy level. The stimulated emission passes the light-transmitting electrode layer 35 and further the support sheet 39. Subsequently, the stimulated emission is collected by the light collecting guide 75 which is placed in the vicinity of the device 30 and then converted to a series of electric signals in the photodetector 76 which is connected to the collecting guide 75. The electric signals are supplied to the signal-processing unit 77. The combination of the light-collecting guide 75 and the photodetector 76 moves in the direction of arrow on the image-reproducing device 30 according to the rate of the application of electric field to collect whole stimulated emission released from the whole surface of the device 30.

Figure 19:
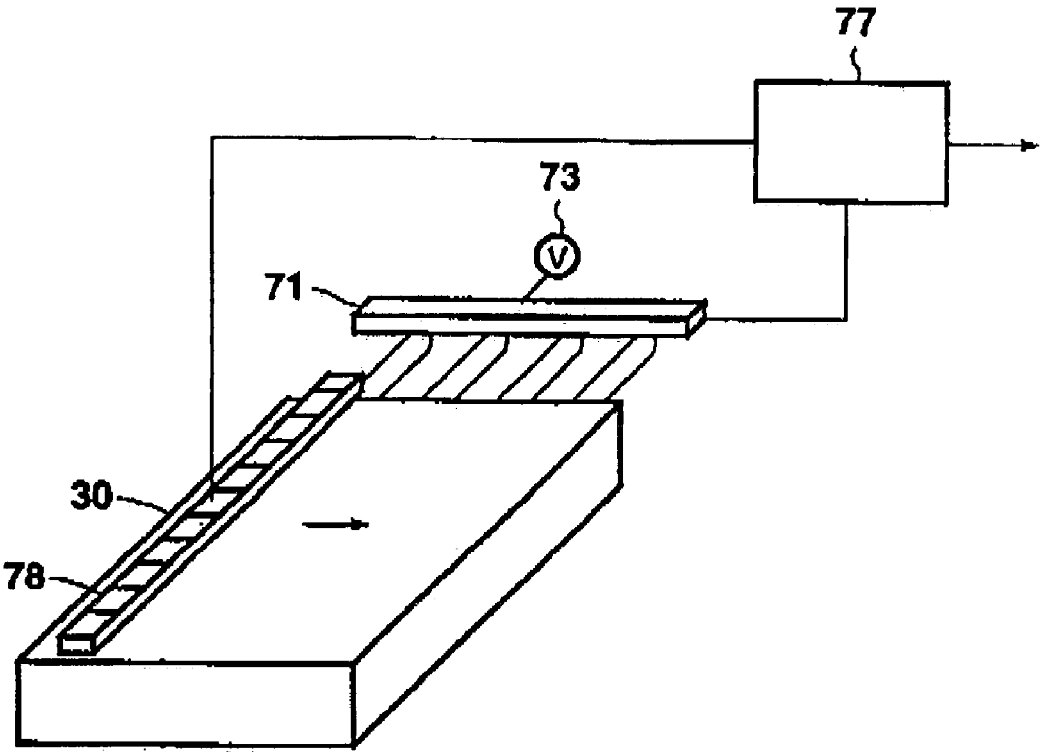

The radiation image-reproducing device which is designed for line-scanning but has neither photoelectric conversion layer nor light-collecting optical waveguide layer (FIGS. 10 & 3) can be utilized in combination with the apparatus of FIG. 19 for reproducing the radiation image. In the apparatus of FIG. 19, the image-reproducing is performed from the side of the support sheet (protective layer) 39 of the device 30.

In FIG. 19, the front side light-transmitting electrode layer 33 and the back side light-transmitting electrode layer 35 of the device 30 is connected to the X-direction control circuit 71. When the electric voltage generated in the voltage source 73 is applied to the stimulable phosphor layer 34 under one-dimensional control by the X-direction control circuit 71, the stimulable phosphor in the linear area of the stimulable phosphor layer 34 to which the electric voltage is applied is stimulated with the electric field and releases a stimulated emission corresponding to the stored energy level. The linearly stimulated emission passes the light-transmitting electrode layer 35 and further the support sheet 39. Subsequently, the linearly stimulated emission is detected by a linear detector 78 (e.g., line sensor) which is placed in the vicinity of the device 30 and then converted therein to a series of electric signals. The electric signals are supplied to the signal-processing unit 77. The linear detector 78 moves in the direction of arrow on the image-reproducing device 30 according to the rate of the application of electric field to collect whole stimulated emission released from the whole surface of the device 30.

In the radiation image reading apparatus of FIGS. 18 and 19, the photomultiplier tube or the line sensor works to move on the radiation image-reproducing device for detecting the stimulated emission. However, there is no need of separating the stimulated emission from the stimulating light in the detection procedure, and further the stimulated emission is multiplied by the application of electric field. Therefore, a reproduced radiation image of a high quality can be obtained, and the design of the reading apparatus can be simplified.

When the radiation image-reproducing set 40 of FIG. 11 is employed, the radiation image storage panel 40*a* and a fluorescent sheet 40*b* are combined under the condition that the protective layer 46 is brought into contact with the protective layer 49. Subsequently, a radiation is applied onto the radiation image storage panel 40*a* so that the radiation image is stored in the storage panel. This procedure is preferably performed in a cassette to fix the combination of the fluorescent sheet and the storage panel. Particularly, it is preferred that the fluorescent sheet is fixed to a cassette. The application of radiation can be made on the side of the fluorescent sheet 40*b*.

Subsequently, the radiation image storage panel 40*a* is separated from the fluorescent sheet 40*b*, and mounted to the reading apparatus of FIG. 18 or FIG. 19. The mounting is performed under the condition that the protective layer 46 of the storage panel 40*a* is placed on the upper side to face the photodetector. The reading procedure can be performed in the same manner as above. If the storage panel 40*a* is designed for point-scanning (see FIGS. 2, 13*a* & 15*a*), the point-scanning with electric field can be performed using the apparatus of FIG. 18. If the storage panel 40*a* is designed for line-scanning (see FIGS. 3, 13*b* & 15*b*), the line-scanning with electric field can be performed using the apparatus of FIG. 19.

If the radiation image storage panel has no radiation-absorbing phosphor layer as illustrated in FIG. 12, the stimulated emission can be detected on both surface sides if the support sheet and protective layer are both made transparent. For instance, if the combination of the light-collecting guide 75 and the photodetector 76 is further placed under the radiation image storage panel 40*a*, the stimulated emission can be collected on both sides.

What is claimed is:

1. A device for reproducing a radiation image comprising at least one radiation-absorbing phosphor layer containing a phosphor which absorbs a radiation and subsequently emits a light, a stimulable phosphor layer containing a stimulable phosphor which absorbs the light and stores energy of the light therein which is releasable in the form of light emission by stimulation with electric field, a first electrode layer placed on an upper surface of the stimulable phosphor layer and a second electrode layer placed on a lower surface of the stimulable phosphor layer in which at least one of said first and second electrode layers is a light-transmitting electrode layer, and a light-detecting layer which is arranged on the light-transmitting electrode of the stimulable phosphor layer, wherein the at least one radiation-absorbing phosphor layer is positioned closer to an upper surface of the device than said first electrode layer.

2. The device of claim 1, in which the light-detecting layer comprises a photoelectric conversion layer, at least one of said first and second electrode layers is positioned on one surface of the conversion layer, and a third electrode layer is positioned on the other surface of the conversion layer, wherein at least one of said first, second, and third electrode layers facing said stimulable phosphor layer is light-transmitting.

3. The device of claim 1, in which the light-detecting layer comprises a light-collecting optical waveguide layer.

4. The device of claim 1, which comprises in order said at least one radiation-absorbing phosphor layer; said first electrode layer, said first electrode layer being light-transmitting; said stimulable phosphor layer; said second electrode layer, said second electrode layer being light-transmitting; and said light detecting layer.

5. The device of claim 1, which comprises in order said at least one radiation-absorbing phosphor layer; said light-detecting layer; said first electrode layer, said first electrode layer being light-transmitting; said stimulable phosphor layer; and said second electrode layer, said second electrode layer being light-transmitting or non-light-transmitting.

6. The device of claim 1, which comprises in order said at least one radiation-absorbing phosphor layer; said first electrode layer, said first electrode layer being light-transmitting; said stimulable phosphor layer; said second electrode layer, said second electrode layer being light transmitting; said light-detecting layer; and a second radiation-absorbing phosphor layer.

7. The device of claim 1, which comprises in order said at least one radiation-absorbing phosphor layer; said light-detecting layer; said first electrode layer, the first electrode layer being light-transmitting; said stimulable phosphor layer; said second electrode layer, said second electrode layer being light transmitting; and a second light-detecting layer.

8. The device of claim 1, which comprises in order said at least one radiation-absorbing phosphor layer; said light-detecting layer, said light-detecting layer being two-dimensional; said first electrode layer, said first electrode layer being light-transmitting; said stimulable phosphor layer; said second electrode layer, said second electrode layer being light-transmitting; a second light-detecting layer, said second light-detecting layer being two-dimensional; and a second radiation-absorbing phosphor layer.

9. The device of claim 1, in which said first electrode layer for stimulating the stimulable phosphor layer is composed of plural electrode strips regularly arranged in parallel with each other on a plane of said first electrode layer, and said second electrode layer for stimulating the stimulable phosphor layer is also composed of plural electrode strips regularly arranged in parallel with each other on a plane of said second electrode layer or is a plane electrode.

10. A method for reproducing a radiation image which comprises the steps of:

applying onto a device of claim 1 an image of radiation having passed through a subject, an image of radiation having been emitted by a subject, or an image of radiation having been scattered or diffracted by a subject, so as to excite the stimulable phosphor and store energy of the applied radiation in the stimulable phosphor layer in the form of a two-dimensional latent energy image directly and after conversion in the radiation-absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission in the light-detecting layer;

converting the collected light emission into a series of electric signals; and producing an image corresponding to the latent image by processing the electric signals.

11. A device for reproducing a radiation image comprising at least one radiation-absorbing phosphor layer containing a phosphor which absorbs a radiation and subsequently emits a light, a stimulable phosphor layer containing a stimulable phosphor which absorbs the light and stores energy of the light therein which is releasable in the form of light emission by stimulation with electric field, and a light-transmitting electrode layer placed on each of an upper surface and a lower surface of the stimulable phosphor layer, wherein the at least one radiation-absorbing phosphor layer is positioned closer to an upper surface of the device than a first electrode layer.

12. The device of claim 11, in which one light-transmitting electrode layer for stimulating the stimulable phosphor layer is composed of plural electrode strips regularly arranged in parallel with each other on a plane of the electrode layer, and another light-transmitting electrode layer for stimulating the stimulable phosphor layer is also composed of plural electrode strips regularly arranged in parallel with each other on a plane of the latter electrode layer or is a plane electrode.

13. A method for reproducing a radiation image which comprises the steps of:

applying onto a device of claim 11 an image of radiation having passed through a subject, an image of radiation having been emitted by a subject, or an image of radiation having been scattered or diffracted by a subject, so as to excite the stimulable phosphor and store energy of the applied radiation in the stimulable phosphor layer in the form of a two-dimensional latent energy image directly and after conversion in the radiation-absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission through the light-transmitting electrode layer on the side having no radiation absorbing phosphor layer;

converting the collected light emission into a series of electric signals; and producing an image corresponding to the latent image by processing the electric signals.

14. A set for reproducing a radiation image which is composed of a fluorescent sheet containing a phosphor which absorbs a radiation and subsequently emits a light and a radiation image storage panel comprising a stimulable phosphor layer containing a stimulable phosphor which absorbs the light and stores energy of the light therein which is releasable in the form of light emission by stimulation with electric field, and a light-transmitting electrode layer placed on each of an upper surface and a lower surface of the stimulable phosphor layer, wherein the fluorescent sheet is positioned closer to an upper surface of the device than said light-transmitting electrode layer.

15. The set of claim 14, in which the radiation image storage panel has on one side of the stimulable phosphor layer a radiation-absorbing phosphor layer containing a phosphor which absorbs a radiation and subsequently emits a light.

16. The set of claim 14, in which one light-transmitting electrode layer for stimulating the stimulable phosphor layer is composed of plural electrode strips regularly arranged in parallel with each other on a plane of the electrode layer, and another light-transmitting electrode layer for stimulating the stimulable phosphor layer is also composed of plural electrode strips regularly arranged in parallel with each other on a plane of the latter electrode layer or is a plane electrode.

17. A method for reproducing a radiation image which comprises the steps of:

combining the fluorescent sheet and the radiation image storage panel of claim 14 in such manner that the fluorescent sheet is arranged on the stimulable phosphor layer via the light-transmitting electrode layer;

applying onto the fluorescent sheet or the radiation image storage panel a radiation having passed through a subject, a radiation having been emitted by a subject, or a radiation having been scattered or diffracted by a subject, so as to excite the stimulable phosphor and store energy of the applied radiation in the stimulable phosphor layer in the form of a two-dimensional latent energy image directly and after conversion in the radiation absorbing phosphor layer;

applying an electric field to the stimulable phosphor layer to re-excite the phosphor in the stimulable phosphor layer so that the energy stored in the stimulable phosphor layer in the form of a latent image is released in the form of light emission;

collecting the light emission through the light-transmitting electrode layer on the side having no radiation absorbing phosphor layer;

converting the collected light emission into a series of electric signals; and producing an image corresponding to the latent image by processing the electric signals.

* * * * *